United States Patent
Parks

(10) Patent No.: US 12,411,291 B2
(45) Date of Patent: Sep. 9, 2025

(54) ALIGNMENT OF PHOTONIC SYSTEM COMPONENTS USING A REFERENCE SURFACE

(71) Applicant: Fluxus, Inc., Sunnyvale, CA (US)

(72) Inventor: Joshua Wayne Parks, Portland, OR (US)

(73) Assignee: Fluxus, Inc., Sunnyvale, CA (US)

( * ) Notice: Subject to any disclaimer, the term of this patent is extended or adjusted under 35 U.S.C. 154(b) by 224 days.

(21) Appl. No.: 17/794,796

(22) PCT Filed: Feb. 4, 2021

(86) PCT No.: PCT/US2021/016606
§ 371 (c)(1),
(2) Date: Jul. 22, 2022

(87) PCT Pub. No.: WO2021/158784
PCT Pub. Date: Aug. 12, 2021

(65) Prior Publication Data
US 2023/0114532 A1    Apr. 13, 2023

Related U.S. Application Data

(60) Provisional application No. 62/970,018, filed on Feb. 4, 2020.

(51) Int. Cl.
*G02B 6/42* (2006.01)
*B23K 26/53* (2014.01)
(Continued)

(52) U.S. Cl.
CPC ............ *G02B 6/423* (2013.01); *B23K 26/53* (2015.10); *B28D 5/0011* (2013.01);
(Continued)

(58) Field of Classification Search
CPC ............................. G02B 6/423; G02B 6/4232
See application file for complete search history.

(56) References Cited

U.S. PATENT DOCUMENTS 5,071,213 A * 12/1991 Chan .................... G02B 6/4214
385/38
6,222,967 B1 * 4/2001 Amano ................. G02B 6/424
385/88
(Continued)

FOREIGN PATENT DOCUMENTS

| JP | 11-258429 A | * | 9/1999 |
| JP | 2000-352639 A | * | 12/2000 |
| WO | 2020/004872 A1 | | 1/2020 |

OTHER PUBLICATIONS

3D MicroMac AG. (2018). "TLS-Dicing: A Novel Laser-Based Dicing Approach for Silicon Carbide Power Devices", 6 pages.
(Continued)

*Primary Examiner* — Michael Stahl
(74) *Attorney, Agent, or Firm* — Morrison & Foerster LLP

(57) ABSTRACT

Systems and method for aligning components of photonic systems are provided. An optical component for integration into and optical coupling within a photonic system is created by separating the component from a substrate to form a precisely defined surface on the optical component, the surface being precisely spaced from an optical feature of the component to be optically coupled within the photonic system. The precisely defined surface of the optical component is then pressed against a reference surface to position the optical feature in a predefined position and/or orientation for optical coupling of the optical feature within the photonic system. Passive precise alignment and optical coupling
(Continued)

is thus provided without the need for iterative readjustment, multi-axis feedback, or active feedback.

61 Claims, 14 Drawing Sheets

(51) Int. Cl.
 B28D 5/00 (2006.01)
 C03B 33/02 (2006.01)
 B23K 103/00 (2006.01)
(52) U.S. Cl.
 CPC ........ *C03B 33/0222* (2013.01); *G02B 6/4232* (2013.01); *B23K 2103/52* (2018.08); *B23K 2103/54* (2018.08); *B23K 2103/56* (2018.08)

(56) References Cited

U.S. PATENT DOCUMENTS

| | | | |
|---|---|---|---|
| 7,050,678 B1* | 5/2006 | Isono | G02B 6/4255 385/39 |
| 7,511,258 B2* | 3/2009 | Bowen | G02B 6/423 385/52 |
| 7,566,635 B2 | 7/2009 | Fujii et al. | |
| 7,939,430 B2 | 5/2011 | Sakamoto et al. | |
| 8,058,103 B2 | 11/2011 | Fukumitsu et al. | |
| 8,134,099 B2 | 3/2012 | Nakano et al. | |
| 8,268,704 B2 | 9/2012 | Fujii et al. | |
| 8,304,325 B2 | 11/2012 | Fujii et al. | |
| 8,314,013 B2 | 11/2012 | Fujii et al. | |
| 8,441,709 B2 | 5/2013 | Matsumoto et al. | |
| 8,518,800 B2 | 8/2013 | Fujii et al. | |
| 8,518,801 B2 | 8/2013 | Fujii et al. | |
| 8,519,511 B2 | 8/2013 | Fujii et al. | |
| 8,526,091 B2 | 9/2013 | Ito et al. | |
| 8,551,817 B2 | 10/2013 | Fukumitsu et al. | |
| 8,610,993 B2 | 12/2013 | Matsumoto et al. | |
| 8,755,107 B2 | 6/2014 | Sakamoto et al. | |
| 8,889,525 B2 | 11/2014 | Fujii et al. | |
| 9,001,411 B2 | 4/2015 | Matsumoto et al. | |
| 9,142,458 B2 | 9/2015 | Fujii et al. | |
| 9,287,177 B2 | 3/2016 | Fujii et al. | |
| 9,415,461 B2 | 8/2016 | Ito et al. | |
| 9,428,413 B2 | 8/2016 | Nakano et al. | |
| 9,488,831 B2 | 11/2016 | Ito et al. | |
| 9,543,207 B2 | 1/2017 | Fujii et al. | |
| 9,543,256 B2 | 1/2017 | Fujii et al. | |
| 9,548,246 B2 | 1/2017 | Fujii et al. | |
| 9,553,023 B2 | 1/2017 | Fujii et al. | |
| 9,711,405 B2 | 7/2017 | Fujii et al. | |
| 9,823,419 B1 | 11/2017 | Pelletier et al. | |
| 10,068,801 B2 | 9/2018 | Fujii et al. | |
| 10,324,285 B2 | 6/2019 | Ito et al. | |
| 10,328,521 B2 | 6/2019 | Sakamoto et al. | |
| 2002/0015557 A1 | 2/2002 | Yap et al. | |
| 2002/0037141 A1 | 3/2002 | Miyamoto et al. | |
| 2002/0071641 A1* | 6/2002 | Nakanishi | G02B 6/4201 385/88 |
| 2002/0090013 A1* | 7/2002 | Murry | G02B 6/4257 372/36 |
| 2003/0137022 A1* | 7/2003 | Dautartas | G02B 6/4228 257/E31.128 |
| 2009/0317036 A1* | 12/2009 | Lenderink | G02B 6/4232 385/52 |
| 2010/0074573 A1* | 3/2010 | Yoshikawa | G02B 6/423 385/14 |
| 2011/0164849 A1* | 7/2011 | Rogers | G02B 6/423 29/830 |
| 2014/0082935 A1* | 3/2014 | Gold | G02B 6/4224 29/739 |
| 2014/0093213 A1* | 4/2014 | Hofrichter | G02B 6/4234 385/88 |
| 2016/0050019 A1 | 2/2016 | Gothoskar et al. | |
| 2016/0170155 A1* | 6/2016 | Dorrestein | G02B 6/4245 385/88 |
| 2021/0239915 A1* | 8/2021 | DeMerritt | G02B 6/4206 |
| 2021/0311267 A1* | 10/2021 | Kim | G02B 6/423 |

OTHER PUBLICATIONS

Advanced Optics. "Optical Flat Manufacturer," located at a href="https://web.archive.org/web/20190317182740/https" target="_blank"https://web.archive.org/web/20190317182740/https/a:/a href="www.advancedoptics.com/optical-flats.html" target="_blank"www.advancedoptics.com/optical-flats.html/a visited on Mar. 17, 2019. (7 pages).
Edmund Optics Worldwide. "Gaussian Beam Propogation," located at a href="https://www.edmundoptics.com/knowledge-center/application-notes/lasers/gaussian-beam-propagation/" target="_blank"https://www.edmundoptics.com/knowledge-center/application-notes/lasers/gaussian-beam-propagation//a visited on Jan. 31, 2023. (13 pages).
Griesmann et al. (2007). "Manufacture and Metrology of 300 mm Silicon Wafers with Ultra-Low Thickness Variation," AIP Conference Proceedings 931: 105-110.
Hamamatsu. (Mar. 2005). "Stealth Dicing Technology and Applications," Technical Information (8 pages).
Hauffe et al. (2001). "Methods for passive fiber chip coupling of integrated optical devices." IEEE Transactions on Advanced Packaging 24: 450-455.
International Search Report and Written Opinion dated Jun. 21, 2021, directed to International Application No. PCT/US2021/016606; 22 pages.
Invitation to Pay Additional Fees mailed Apr. 29, 2021, directed to International Application No. PCT/US2021/016606; 17 pages.
Keyence. "The Basics of GD&T and Measurement Skills," GD&T Fundamentals located at a href="https://www.keyence.com/ss/products/measure-sys/gd-and-t/advanced/envelope-requirement.jsp#/section4" target="_blank"https://www.keyence.com/ss/products/measure-sys/gd-and-t/advanced/envelope-requirement.jsp#section4/a visited on Jan. 31, 2020. (5 pages).
Light Machinery. "Uniform Thickness Wafers, Windows & Ultra-Flat Substrates," located at a href="https://web.archive.org/web/20191020200307/https" target="_blank"https://web.archive.org/web/20191020200307/https/a:/lightmachinery.com/optics/custom-optics/ultra-flat-thin-substrates/ visited on Oct. 20, 2019. (6 pages).
Lindenmann et al. (Jul. 30, 2012). "Photonic wire bonding: a novel concept for chip-scale interconnects," Optics Express 20(6): 17667-17677.
Moore. (Dec. 8, 2006). "Single Mode Fiber Coupling: Sensitivities and Tolerancing," Opti521 Tutorial. (11 pages).
MPI. "Silicon Photonics Water Probing Solutions." located at a href="https://www.mpi-corporation.com/ast/applications/silicon-photonics-on-wafer-test/" target="_blank"https://www.mpi-corporation.com/ast/applications/silicon-photonics-on-wafer-test//a, visited on Jan. 31, 2020. (4 pages).
PIC Magazine News. "FiconTEC is Enabling High Volume Automated PIC Assembly and Testing," located at a href="https://picmagazine.net/article/105014/FiconTEC_Is_Enabling_High_Volume_Automated_PIC_Assembly_And_Testing/feature" target="_blank"https://picmagazine.net/article/105014/FiconTEC_Is_Enabling_High_Volume_Automated_PIC_Assembly_And_Testing/feature/a visited on Jan. 31, 2020. (23 pages.).
PM Optics. "Gaussian Beam Coupling, " located at a href="https://www.pmoptics.com/gaussian_beam_coupling.html"target="_blank"https://www.pmoptics.com/gaussian_beam_coupling.html/a visited on Jan. 31, 2020. (3 pages).
Reed et al. (2004). A. P. Silicon Photonics: An Introduction, John Wiley and Sons Ltd., pp. 1-276.
RP Photonics. "Where to Buy Optical Flats," located at a href="https://web.archive.org/web/20201031041635/https"target="_blank"https://web.archive.org/web/20201031041635/https/a:/a href="www.rp-photonics.com/bg/buy_optical_flats.html?s=vbox" target="_blank"www.rp-photonics.com/bg/buy_optical_flats.html?s=vbox/a retrieved archived copy dated Jan. 31, 2020. (8 pages).

(56) References Cited

OTHER PUBLICATIONS

Shimamura et al. (2012). "Molecular-Dynamics Study of Void-Formation inside Silicon Wafers in Stealth Dicing," Journal of Physic: Conferences Series 402 (9 pages).

Suzuki et al. (2018). "Improving Throughput of Zero-Kerf Singulation for Ultra-Thin Wafers using Stealth Dicing," in 13th International Microsystems, Packaging, Assembly and Circuits Technology Conference (IMPACT). Taipei, Taiwan, Oct. 4-26, 2018; 6 pages.

Waldhäusl et al. (Dec. 20, 1997). "Efficient Coupling into Polymer Waveguides by Gratings," Applied Optics 36(36), 9383-9390.

Zuhlke et al. (May 2009). "TLS-Dicing—an innovative alternative to known technologies," ASMC; pp. 28-32.

Office Action dated Jan. 10, 2025, directed to EP Application No. 21709217.0; 9 pages.

Notice of Reasons for Rejection dated Nov. 5, 2024, directed to JP Application No. 2022-547045; 9 pages.

\* cited by examiner

ALIGNMENT OF PHOTONIC SYSTEM COMPONENTS USING A REFERENCE SURFACE

CROSS-REFERENCE TO RELATED APPLICATIONS

This application is a U.S. national stage application under 35 U.S.C. § 371 of International Application No. PCT/US2021/016606, filed Feb. 4, 2021, which claims the benefit of U.S. Provisional Application No. 62/970,018, filed on Feb. 4, 2020, the contents of each priority application are incorporated herein by reference in its entirety for all purposes.

FIELD OF THE DISCLOSURE

The present disclosure relates generally to methods for aligning and coupling optical components, and more particularly to methods for aligning precisely-sized components of photonic systems, such as integrated circuits, using a reference surface against which one or more of the components are positioned.

BACKGROUND OF THE DISCLOSURE

Photonic systems, such as photonic integrated circuits, may be assembled from multiple dies and/or other components that must be aligned with one another during fabrication of the system. For example, one or more dies and/or fibers may need to be optically aligned during fabrication of a photonic system.

Known techniques for aligning and coupling optical components rely on active alignment and adjustment of components based on optical verification that the one or more components are optically aligned. For example, components may be aligned, adjusted, and iteratively readjusted until sufficient optical coupling of components is achieved and verified. Such alignment often requires control through complicated equipment such as multi-axis stages with active feedback. While V-groove technology can be used to space fibers at regular intervals, this technology is costly and takes up valuable wafer real-estate for coupling structures, and adds fabrication complexity to the chip fabrication process. Furthermore, it is not amenable to coupling chips to other chips. Photonic wire bonding may also be used, allowing direct connection of waveguide through laser writing of waveguide material. While the photonic wire bonding process is flexible, it lacks industrial stability, ease of use, and reliability. Grating couplers have also been developed and allow for free space beams to be coupled into planar waveguides. Once fabricated, they allow for increased alignment tolerances and mode conversion. However, the structures are difficult to fabricate (requiring precise structuring at sub-micron sizes), have a poor spectral bandwidth, and afford poor coupling efficiencies compared to other methods.

SUMMARY OF THE DISCLOSURE

As described above, known techniques for aligning components of photonic systems (such as photonic integrated circuits) rely on iterative and/or technically challenging (and expensive) alignment of components, adjustment of components, and verification of optical coupling of components. These steps are labor intensive and time consuming and prevent the development of parallelization and other efficiencies in fabrication of photonic systems. Accordingly, there is a need for improved techniques for fabrication of photonic systems that allow passive alignment of system components and that obviate the need for iterative readjustment and optical verification of alignment of components.

Disclosed herein are improved techniques that may address the above needs. In some embodiments, as described herein, optical elements (e.g., dies or other components for photonic systems) may be fabricated to precise size and shape specifications and may then be positioned against one or more optical reference surfaces of a micro-optical bench. By precisely sizing the optical components and then positioning them in a predetermined position against the one or more reference surfaces, the optical components may be precisely aligned with one or more other optical components, and optical coupling may be achieved without active alignment (e.g., without the need for adjustable alignment components, iterative readjustments, active feedback, or the like). Thus, passive alignment and coupling of optical components may be achieved by placing the precisely sized optical components against the one or more reference surfaces of the micro-optical bench.

In some embodiments, an optical component such as a die for use in the alignment techniques described herein may be precisely fabricated using a laser-based dicing process. In a laser-based dicing process, a laser is used to create a stressed region in a wafer and the wafer is then fractured along the stressed region to create the die, the die having a precisely positioned and very flat/uniform edge defined by the stressed region. In some embodiments, a micro-optical bench used in the alignment techniques described herein may be precisely fabricated using one or more physical and/or chemical etching steps, one or more precision machining steps, and/or one or more precision replication techniques such as embossing or injection molding.

In some embodiments, a first method for aligning components of a photonic system is provided, the first method comprising: separating a first component from a substrate such that the first component comprises a first surface that is a predetermined distance from an optical feature of the first component, and positioning the first component at a predetermined position on a positioning surface by pressing the first surface of the first component against a first reference surface, wherein positioning the first component in the predetermined position causes the first optical feature of the first component to optically align with a second optical feature of a photonic system into which the first component is integrated.

In some embodiments of the first method, separating the first component from the substrate comprises: creating a dicing layer in the substrate; and applying force to the substrate to separate the first component from a remainder of the substrate along the dicing layer, wherein separating the first component along the dicing layer creates the first surface of the first component formed along the dicing layer.

In some embodiments of the first method, creating a dicing layer in the substrate comprises focusing a laser on a plurality of internal locations of the substrate.

In some embodiments of the first method, the first surface of the first component satisfies an envelope requirement of less than or equal to +100 μm and less than or equal to −100 μm.

In some embodiments of the first method, separating the first component from the substrate causes the first surface to satisfy the envelope requirement of the first surface.

In some embodiments of the first method, the positioning surface and the first reference surface are part of a micro-optical bench.

In some embodiments of the first method, the positioning surface is transverse to and adjacent to the first reference surface.

In some embodiments of the first method, wherein: the micro-optical bench comprises a second reference surface, wherein the second reference surface is transverse to and adjacent to both the first reference surface and the positioning surface, and positioning the first component in the predetermined position comprises pressing a second surface of the first component against the second reference surface.

In some embodiments of the first method, the micro-optical bench comprises a secondary component surface parallel to the positioning surface.

In some embodiments of the first method: the second optical feature is provided by an optical fiber, and the secondary component surface comprises a groove configured to accept the optical fiber.

In some embodiments of the first method: an end of the optical fiber that optically aligns with the first component extends beyond an edge of the secondary component surface and overlaps with the positioning surface; and positioning the first component in the predetermined position comprises pressing a second surface of the first component against the end of the optical fiber.

In some embodiments of the first method, the end of the optical fiber extends beyond the edge of the secondary component surface by a distance of less than or equal to 5 mm.

In some embodiments of the first method, the optical fiber has a diameter of less than or equal to 5 mm.

In some embodiments of the first method, an end of the optical fiber that optically aligns with the first component is flush with an edge of the secondary component surface.

In some embodiments of the first method, the micro-optical bench comprises a third reference surface, wherein the third reference surface is parallel to the first reference surface and is adjacent to the positioning surface.

In some embodiments of the first method, the micro-optical bench comprises one or more indentations formed in the first reference surface.

In some embodiments of the first method, the positioning surface and the first reference surface are formed by etching into a body of the micro-optical bench.

In some embodiments of the first method: etching into the body of the micro-optical bench comprises removing a first layer comprising a first material and not removing a second layer comprising a second material.

In some embodiments of the first method: etching into the body of the micro-optical bench comprises chemically removing material from the body at a predefined rate.

In some embodiments of the first method, the micro-optical bench is formed by a precision replication technique.

In some embodiments of the first method: the micro-optical bench comprises a plurality of reconfigurable pieces, a first piece of the plurality of reconfigurable pieces comprises the positioning surface, a second piece of the plurality of reconfigurable pieces comprises the first reference surface; and the micro-optical bench is formed by placing the first piece in contact with the second piece.

In some embodiments of the first method, the second optical feature is provided by a second component.

In some embodiments of the first method, the second component is positioned on the positioning surface.

In some embodiments of the first method, the second component is positioned on a side of the first die opposite the positioning surface.

In some embodiments of the first method, the micro-optical bench comprises an optical element.

In some embodiments of the first method, the positioning surface of the micro-optical is formed of a transparent material.

In some embodiments of the first method, positioning the first component in the predetermined position causes a first alignment structure of the first component to align with a corresponding second alignment structure of the second component.

In some embodiments of the first method, positioning the first component in the predetermined position causes a first alignment structure of the first component to align with a corresponding third alignment structure integrated into a surface selected from the positioning surface and the first reference surface.

In some embodiments of the first method, positioning the first component in the predetermined position causes a first electrical connector structure of the first component to align with a second electrical connector structure of the second component.

In some embodiments of the first method, positioning the first component in the predetermined position causes a first electrical connector structure of the first component to align with a third electrical connector structure integrated into a surface selected from the positioning surface and the first reference surface.

In some embodiments of the first method, separating the first component from the substrate comprises creating an optical facet in the first component.

In some embodiments of the first method, the positioning surface satisfies an envelope requirement of less than or equal to +100 μm and −100 μm.

In some embodiments of the first method, the first reference surface satisfies an envelope requirement of less than or equal to +100 μm and −100 μm.

In some embodiments of the first method, the first component comprises one or more of silicon, sapphire, gallium arsenide, glass, lithium tantalite, silicon carbide, lithium niobate, quartz glass, borosilicate glass, gallium nitride, and indium phosphide.

In some embodiments of the first method, the first component is a die and wherein the substrate is a wafer.

In some embodiments of the first method, the micro-optical bench comprises one or more of silicon, glass, fused silica, quartz, lithium niobate, ceramic, polymer, thermoplastic, and photoresist.

In some embodiments of the first method: the first component comprises a first set of microadjustment pads having a first spacing, positioning the first component in the predetermined position on the positioning surface comprises positioning the first set of microadjustment pads to face a second set of microadjustment pads disposed on an adjacent component, the second set of microadjustment pads having a second spacing different from the first spacing, and the method further comprises heating a pair of microadjustment pads comprising a first pad in the first set and a second pad in the second set, wherein the heating causes a relative positioning of the first component and the adjacent component to change so as to align the pair of microadjustment pads.

In some embodiments of the first method, the adjacent component is positioned on the positioning surface.

In some embodiments of the first method, the adjacent component is a micro-optical bench of which the positioning surface is a part.

In some embodiments of the first method, the first method further comprises bonding the first component to an adjacent component by: focusing a laser on an interface between the first component and the adjacent component such that part of at least one of the first component and the adjacent component heats and becomes molten material; and ceasing laser excitation to allow the molten material to cool and solidify to bond the first component to the adjacent component.

In some embodiments of the first method, the adjacent component is positioned on the positioning surface.

In some embodiments of the first method, the adjacent component is a micro-optical bench of which the positioning surface is a part.

In some embodiments, a fabrication system for aligning photonic systems is provided, the fabrication system comprising: a positioning surface adjacent to and transverse to a first reference surface, wherein the positioning surface and first reference surface are configured such that pressing a first surface of a first component against the first reference surface causes the first component to be positioned in a predetermined position such that an optical feature of the first component is aligned with a second optical feature of a photonic system into which the first component is integrated.

In some embodiments of the fabrication system, the positioning surface satisfies an envelope requirement of less than or equal to +100 µm and less than or equal to −100 µm.

In some embodiments of the fabrication system, the first reference surface satisfies an envelope requirement of less than or equal to +100 µm and less than or equal to −100 µm.

In some embodiments of the fabrication system, the positioning surface is transverse to and adjacent to the first reference surface.

In some embodiments of the fabrication system, the fabrication system further comprises a second reference surface, wherein the second reference surface is transverse to and adjacent to both the first reference surface and the positioning surface, and wherein the positioning surface, first reference surface, and second reference surface are configured such that pressing a second surface of the first component against the second reference surface causes the first component to be positioned in the predetermined position.

In some embodiments of the fabrication system, the fabrication system further comprises a secondary component surface parallel to the positioning surface.

In some embodiments of the fabrication system, the positioning surface and the first reference surface are part of a micro-optical bench.

In some embodiments, a photonic system is provided, the photonic system comprising a first component and a second component aligned with one another such that a first optical feature of the first component is optically coupled with a second optical feature of the second component, wherein the first component and the second component are aligned with one another by positioning the first component at a predetermined position on a positioning surface by pressing a first surface of the first component against a first reference surface.

In some embodiments of the photonic system, the first reference surface satisfies an envelope requirement of less than or equal to +100 µm and less than or equal to −100 µm.

In some embodiments of the photonic system, the first surface of the first component satisfies an envelope requirement of less than or equal to +100 µm and less than or equal to −100 µm.

In some embodiments, a second method of aligning components of a photonic system is provided, the second method comprising: positioning a first component and a second component by placing a first surface of the first component in contact with a second surface of the second component, wherein: the first surface comprises a first set of microadjustment pads having a first spacing; and the second surface comprises a corresponding second set of microadjustment pads having a second spacing different from the first spacing; and heating a pair of microadjustment pads comprising a first pad in the first set and a second pad in the second set to cause a relative positioning of the first and second components to change so as to align the pair of microadjustment pads.

In some embodiments, a third method of fabricating an optical component is provided, the third method comprising: creating a dicing layer in the substrate; and applying force to the substrate to separate the first component from a remainder of the substrate along the dicing layer, wherein separating the first component along the dicing layer creates a first surface of the first component formed along the dicing layer and simultaneously creates an optical facet in the first component.

In some embodiments of the third method, the optical facet is disposed at an edge of the first surface.

In some embodiments of the third method, creating the dicing layer comprises performing multiple laser passes focusing at different depths within the substrate to create stress in a predetermined pattern to create the optical facet.

In some embodiments, a fourth method, for aligning components of a photonic system, is provided, the fourth method comprising: positioning a first component at a predetermined position on a positioning surface by pressing a first surface of the first component against a first reference surface, wherein positioning the first component in the predetermined position causes a first optical feature of the first component to optically align with a second optical feature of a photonic system into which the first component is integrated.

In some embodiments, any one or more of the features of any one or more of the embodiments set forth above may be combined with one another, and/or with other features or aspects of any method, system, technique, or device disclosed herein.

DETAILED DESCRIPTION OF DISCLOSURE

Figure 1A:
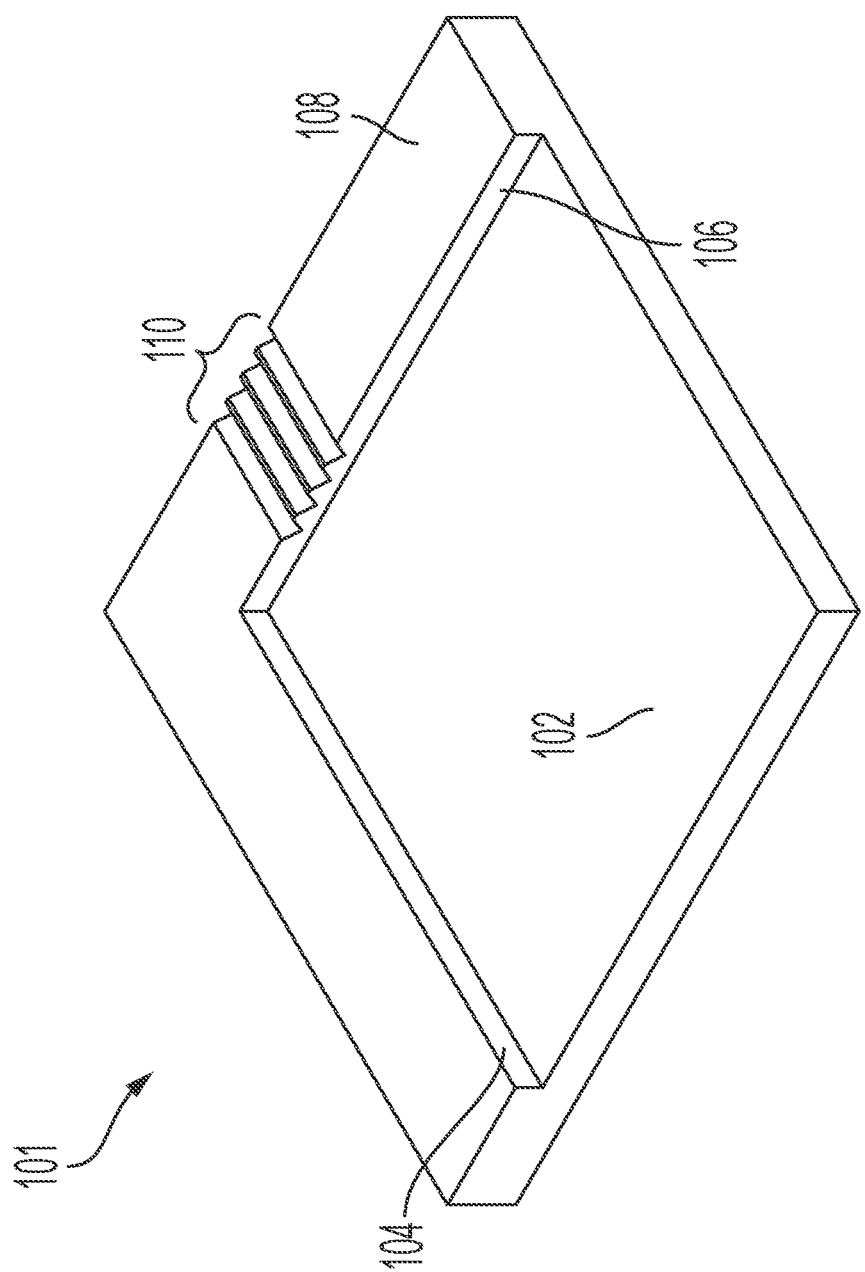
FIGS. 1A and 1B depict a micro-optical bench, in accordance with some embodiments.

In some embodiments, as described herein, passive alignment techniques for optically coupling optical components may replace the laborious, time-consuming, and inefficient active alignment techniques previously known. In some embodiments, a micro-optical bench is used to passively align one or more optical components such as optical dies, fibers, or the like for integration into a photonic system such as a photonic integrated circuit assembly. The micro-optical bench may be configured to include a plurality of reference surfaces against which the one or more optical components may be positioned, such that by positioning the one or more components against the one or more reference surfaces, the components are passively optically aligned and coupled by being positioned in a predefined position (and orientation). As described below in further detail, the micro-optical bench may in some embodiments comprise a plurality of reference surfaces that are perpendicular to one another; in some embodiments, one of the reference surfaces may be provided as a "staging area" or a "positioning area" on which a die or other optical component may be initially placed, and one or more other reference surfaces may be provided as a wall adjacent to and transverse to the surface forming the positioning area. In this way, an optical component such as a die may be placed on the positioning area surface and slid towards and against one or more of the adjacent and perpendicular wall surfaces, thus placing the optical component in a predefined position and orientation for optical alignment and coupling.

In some embodiments, use of passive positioning and alignment techniques such as those described herein may require precisely defined dimensions for both the micro-optical bench and the one or more optical components being positioned and aligned using the bench. Precise fabrication techniques for micro-optical benches are discussed in further detail below. In some embodiments, achieving precise and accurate size, shape, and flatness/smoothness of optical components such as optical dies may be achieved through one or more precise singulation techniques, such as laser-based dicing or plasma-based dicing. The examples herein primarily contemplate using laser-based dicing to singulate a die from a wafer, but in some embodiments any component of an optical system may be singulated from any substrate in a manner such that the component has sufficiently precise sizing so as to be aligned using the techniques discussed herein.

In some embodiments, laser-based wafer dicing may include transmitting a laser beam such that the beam focuses on a region of the wafer (e.g., semiconductor wafer) to be diced to form one or more dies. By focusing the laser on the region of the wafer to be diced, the laser may create defects/stresses within the wafer that are precisely located so as to form a plane within the wafer that defines a dicing layer. (In other singulation techniques, a dicing layer may be formed by different techniques besides laser irradiation, as discussed in further detail below.) Once the defects/stresses are introduced into the wafer, force is applied to the wafer to cause the wafer to fracture along the dicing layer, thereby separating the die from the wafer. In this way, the die that is formed may have a precisely defined and highly smooth, flat, uniform external surface defined by the laser-formed dicing layer.

In some embodiments, application of force to the wafer to cause the wafer to fracture may include one or more techniques such as, but not limited to a "tape expansion" method, a "diving board" method, and/or a "guillotine" method.

According to a "tape expansion" method, in some embodiments, a lateral force (e.g., a force perpendicular to the plane of the dicing layer) may be applied to a medium upon which the wafer is mounted. For example, the wafer may be mounted to an adhesive tape such as a dicing tape that is configured to be able to be stretched outward under application of a lateral force. As the tape stretches under application of the lateral force, the lateral force may be transferred (via adhesion of the tape to the wafer) to the wafer, thereby causing a lateral force to be applied to the wafer and causing the wafer to fracture along the dicing layer.

According to a "diving board" method, in some embodiments, a wafer may be secured (e.g., clamped) in place with a portion of the wafer to be separated extending outward from the clamped portion of the wafer. The dicing layer formed in the wafer may be located a suitable distance outward from the portion of the wafer that is secured (or may be flush with an outward-facing edge of the portion of the wafer that is secured). A blade (e.g., a device configured to exert pressure on the extending portion of the wafer) may then apply force downward on the wafer, e.g., in a direction parallel to the plane of the dicing layer (and parallel to a direction in which the clamping force is applied). The blade may be configured to apply force against the wafer at a location that is located further out along the wafer from the secured portion than the dicing layer. The downward force exerted by the blade may cause the wafer to fracture along the dicing layer. In some embodiments, the wafer may be mounted to an adhesive tape such as a dicing tape during application of a "diving board" method.

According to a "guillotine" method, in some embodiments, a wafer may be placed atop two plates such that the wafer forms a bridge across a gap between the two plates. The dicing layer in the wafer is aligned with the gap, and a blade or other object is used to apply force against the dicing layer of the wafer toward the plates causing the wafer to fracture along the dicing layer as the wafer is forced to deflect into the gap. In some embodiments, the wafer may be mounted to an adhesive tape such as a dicing tape during application of a "guillotine" method.

In any of the three methods described above, the orientation of the wafer in the "up and down" direction (e.g., a direction parallel to the dicing plane and perpendicular to the broad top and bottom surfaces of a wafer) may not be critical. For example, the techniques may be applied with the wafer in the an opposite up-down orientation compared to the above description. In some embodiments, use of tapes in any one of the above methods may mediate, enhance, and/or reduce damage to surfaces of the wafer during the process. For example, tape may be placed on a surface of a wafer between a blade and the wafer such that the blade does not contact the wafer directly, thus preventing damage and distributing the force of the blade.

Surfaces may be characterized using one or more of the following techniques: optical profilometry, stylus based profilometry, atomic force microscopy, optical microscopy, scanning electronic microscopy, coordinate measuring machines, laser interferometry, etc. General features and specifications of micro-optical benches and components (e.g. dies) may be important in the manner in which they affect the true position of components relative to one another. The true position of optical features in the x, y, and z coordinate system may effect the coupling properties of optical fields from one optical element to an adjacent one (see—Reed, G. T. & Knights, A. P. *Silicon Photonics: An Introduction*. (Wiley, 2004)). Thus, overall tolerance sums, in some embodiments, should be kept according to the maximum allowable true positioning inaccuracy for a given optical coupling application (yielding a maximum coupling/insertion optical loss). For example, in the case of a waveguide on die 218*a* meeting a waveguide on die 218*b*, the x and z true positions of the optical facets may need to be kept according to the desired optical loss coefficient, in consideration of coupling loss vs. positional inaccuracy (see, e.g., —Reed, G. T. & Knights, A. P. *Silicon Photonics: An Introduction*, FIG. 4.15 and analytical approximation in equation 4.53 (Wiley, 2004). Concretely, a waveguide with a 10 μm 1/e mode width, when offset by 2 μm in one dimension, causes a 15% coupling loss (0.7 dB). The question of coupling loss is slightly different in the y-direction. Once the beam is emitted from an optical element, the free space propagation approximately follows gaussian beam optics. Simply put, as the beam propagates, it changes in size such that deviation in the y true position will result in a profile that is larger or smaller than the design profile, which in turn may result in lowered coupling efficiency. As such, in some embodiments, the mode expansion should be controlled/designed for such that positional inaccuracies in the y-coupling gap lead to desired coupling coefficients.

Note that the above principles may apply to optical architectures of varying shape, size, refractive index, geometry, profile, etc. One concrete example for single mode to single mode waveguide (10 um 1/e diameter) coupling between waveguides has the following constraints: y directional optimal coupling has a gap of 0 μm. If there are no deviations in x or z directions, a +/−60 μm tolerance in y position is acceptable for −1 dB loss. The more sensitive coupling directions of x and z have a tolerance in placement of approximately +/−3 um in a single direction for the same −1 dB loss. Note that the losses are cumulative, as such, if there was a 60 um deviation in true position of y, and 3 μm positional deviation in true position for both x and z, a −3 dB loss would be observed. Though the above serves as a concrete example for tolerances in a 3 dB loss situation for a 10 um 1/e diameter mode coupling situation, the situation of tolerances can be dramatically different for different geometries of optics/waveguides. Considering the manner in which precise alignment of optical components is necessary for effective optical coupling, it is important to consider tolerances for all geometries that may affect the position and/or orientation of optical components in accordance with this technique.

In some embodiments, one or more techniques for formation of optical components other than laser-based wafer dicing may be used in addition to or alternatively to laser-based wafer dicing, so long as the optical component created has a sufficiently precisely defined size and shape such that passive alignment by pressing the component against a reference surface is effective to achieve optical alignment and coupling.

As used herein, the term "surface" (e.g., "reference surface" or "positioning surface") or "plane" may refer to the outer surface of a component and may be defined, in some embodiments, by any three or more points on the exterior of the component. In some embodiments, a component may be in a stable position with respect to another component when at least three points on the exterior of the first component are in pressed against and in contact with the other component; in this arrangement, it may be said that a first surface of the first component is pressed against the second component. In some embodiments, the combination of contact with reference points on multiple surfaces can precisely place a component (e.g. two points on one reference surface and one point on another reference surface); in this arrangement, it may be said that a first surface of the first component is pressed against the second component.

More generally, while the present disclosure is primarily by reference to examples including "reference surfaces," it will be appreciated that in some embodiments any datum may be used in a similar manner as described herein with respect to a reference surfaces. For example, a datum including a planar surface, a curved surface, and/or one or more points may be used in a similar manner as it is described herein that a reference surface may be used.

Tolerances in the size of the die should be controlled to a precision based on the desired optical coupling coefficient. As the coupling coefficient is based on two optical waveguide mode profile overlaps, the translational misalignment should be smaller than a mode shape. In some embodiments, translational misalignment in any direction may be smaller in length than or equal to 1 mode, 0.5 modes, 0.25 modes, 0.1 modes, 0.01 modes, or 0.001 modes. In some embodiments, translational misalignment in any direction may be greater in length than or equal to 1 mode, 0.5 modes, 0.25 modes, 0.1 modes, 0.01 modes, or 0.001 modes. In some embodiments, translational misalignment in any direction may be less than or equal to 100 μm, 50 μm, 25 μm, 15 μm, 10 μm, 5 μm, 1 μm, 500 nm, 250 nm, 100 nm, 50 nm, or 10 nm. In some embodiments, translational misalignment in any direction may be greater than or equal to 100 μm, 50 μm, 25 μm, 15 μm, 10 μm, 5 μm, 1 μm, 500 nm, 250 nm, 100 nm, 50 nm, or 10 nm. Angular misalignments can be avoided via the precise definition of perpendicular component surfaces. In some embodiments, the angle of component surfaces maybe less than or equal to 30 degrees, 20 degrees, 15 degrees, 10 degrees, 5 degrees, 2 degrees, 1 degree, 0.5 degrees, 0.1 degrees, or 0.01 degrees. In some embodiments, the angle of component surfaces maybe greater than or equal to 30 degrees, 20 degrees, 15 degrees, 10 degrees, 5 degrees, 2 degrees, 1 degree, 0.5 degrees, 0.1 degrees, or 0.01 degrees.

In some embodiments, sufficiently precise positioning of an optical component may depend on and be enabled by the precise definition of the component's shape and/or size (e.g., the precise definition of the shape and size of a die), regardless of the manner by which the component is formed or fabricated. In such cases, the sufficiency of the optical coupling may depend on the tolerance allowed in one or more dimensions as defined by the envelope of the design structure. In the field of geometric dimensioning and tolerancing, an envelope requirement, as applied to a dimension, indicates that if a part conforming to size tolerance is within the envelope of perfect form, which has the maximum material size, the part passes the envelope requirement in that dimension; if not, the part fails to fulfill the envelope requirement in that dimension. The negative of the previous statement is also true: an envelope requirement, as applied to a dimension, may indicate that if a part conforming to size tolerance fully encapsulates the envelope of perfect form, which has the minimum material size, the part passes the envelope requirement in that dimension; if not, the part fails to fulfill the envelope requirement in that dimension. Exemplary envelope requirements for various components disclosed herein are set out below. In some embodiments, in addition to or alternatively to laser-based dicing, techniques used to form optical components such as dies may include physical cutting of wafers using a saw, plasma cutting of wafers, ablative laser dicing, laser jet (waveguide) dicing, TLS dicing (see Zuhlke, H.-U., Eberhardt, G. & Ullmann, R. TLS-Dicing—An innovative alternative to known technologies. in 2009 *IEEE/SEMI Advanced Semiconductor Manufacturing Conference* 28-32 (2009)), scribe and break, and/or dice-before-grind (DBG).

As described in further detail herein, once one or more optical components are positioned with respect to the micro-optical bench and/or with respect to one another, the one or more components may be fixed/bonded in place by being bonded to one another and/or to the micro-optical bench. In some embodiments, any suitable method of bonding may be used, such as adhesive bonding, wire bonding, soldering, welding, or the like.

Reference is now made to the figures below, which illustrate aspects of various embodiments of the techniques disclosed herein.

Figure 1B:
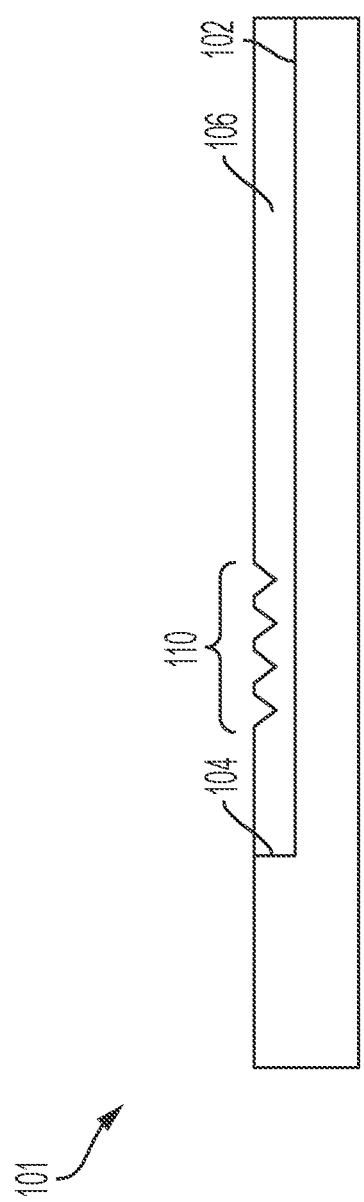

FIGS. 1A and 1B depict a micro-optical bench 101, in accordance with some embodiments. FIG. 1A depicts a perspective view and FIG. 1B depicts a side view. Micro-optical bench 101 is shown in FIGS. 1A and 1B with reference to an x-axis, a y-axis, and a z-axis, which will be referred to herein in order to refer to various surfaces of micro-optical bench 101.

As shown, micro-optical bench 101 comprises xy reference surface 102, yz reference surface 104, and xz reference surface 106, which together define a three-dimensional region in space above xy reference surface 102 (in the orientation shown). In this positioning region, bounded on three sides by the three reference surfaces, one or more optical components may be moved about with respect to micro-optical bench 101 and/or with respect to one another. For example, when micro-optical bench 101 is oriented in the manner shown in FIG. 1A, with xy reference surface 102 facing upward with respect to gravity, an optical component such as a die may be placed loosely on surface 102 such that it may be slid freely about in the x and y directions. After being placed on surface 102, the component may then be slid along surface 102 toward one or more reference surfaces 104 and/or 106. The component may be pressed against one or more of reference surfaces 104 and/or 106 (e.g., it may be pressed against an edge of the positioning region, or into the corner of the positioning region) to place the component in a predefined position and/or orientation for optical alignment and coupling with one or more other optical components.

While the example of FIGS. 1A and 1B shows reference surfaces 102, 104, and 106 as perpendicular to one another, it will be appreciated by one of skill in the art, in light of the disclosure herein, that in some embodiments one or more sets of transverse but non-perpendicular surfaces may be used in addition to or in place of one or more sets of perpendicular reference surfaces.

As shown, micro-optical bench 101 comprises secondary component surface 108, which may be any surface of micro-optical bench 101 configured to receive, hold, position, or support any optical component while one or more other optical components are moved about in the positioning region. In some embodiments, the optical component supported by the secondary component surface may be a static component that is held without moving while the one or more other optical components are moved about in the positioning region. For example, a fiber, die, or other optical component to be aligned and coupled with a component that is moved about in the positioning region may be placed in a static position/orientation on secondary component surface 108 such that, when the optical moving component in the positioning region is pressed against one or more of the reference surfaces 102, 104, and 108 to be brought into its predefined position/orientation, the static component on the secondary component surface 108 may automatically thereby be aligned/coupled with the moving component.

In some embodiments, secondary component surface 108 may comprise one or more features configured to aid in the positioning/alignment of one or more components thereon. For example, as shown in FIGS. 1A and 1B, secondary component surface 108 may include grooves 110 configured to receive and position one or more fibers in a position/orientation for coupling to a moving component in the positioning area. In some embodiments, grooves 110 may be etched into or otherwise integrally formed as a part of surface 108 of micro-optical bench 101. In some embodiments, grooves 110 may be provided as v-grooves such that one fiber may be precisely positioned by being placed in one of the v-shaped grooves.

In some embodiments, a component-alignment feature or fiber-alignment feature of a different shape other than a v-shaped groove may be used, such as a u-shaped groove.

In some embodiments, v-grooves and grooves of a different shape may be included on the same micro-optical bench. In some embodiments, multiple groupings of one or more grooves may be included on the same micro-optical bench. In some embodiments, grooves may be positioned at any location on secondary component surface 108, including at or proximate to the upper edge of yz reference surface 104. In some embodiments, grooves that are transverse to one another may be included on the same micro-optical bench.

In some embodiments, a physical feature may be defined (e.g., defined during an etching step used to create the grooves 110, as discussed below) to precisely position a component or fiber end facet relative to xz reference surface 106. Such a feature is not shown in the example of FIGS. 1A and 1B, but could include, for example, a physical stop.

In some embodiments, micro-optical bench 101 may have a z-dimensional height of less than or equal to 25 µm, 50 µm, 100 µm, 500 µm, 1 mm, 5 mm, 10 mm, or 25 mm. In some embodiments, micro-optical bench 101 may have a z-dimensional height of greater than or equal to 25 µm, 50 µm, 100 µm, 500 µm, 1 mm, 5 mm, 10 mm, or 25 mm.

In some embodiments, micro-optical bench 101 may have an x-dimensional length of less than or equal to 100 µm, 250 µm, 500 µm, 1 mm, 5 mm, 10 mm, 25 mm, 50 mm, 100 mm, or 250 mm. In some embodiments, micro-optical bench 101 may have an x-dimensional length of greater than or equal to 100 µm, 250 µm, 500 µm, 1 mm, 5 mm, 10 mm, 25 mm, 50 mm, 100 mm, or 250 mm.

In some embodiments, micro-optical bench 101 may have a y-dimensional length of less than or equal to 100 µm, 250 µm, 500 µm, 1 mm, 5 mm, 10 mm, 25 mm, 50 mm, 100 mm, or 250 mm. In some embodiments, micro-optical bench 101 may have a y-dimensional length of greater than or equal to 100 µm, 250 µm, 500 µm, 1 mm, 5 mm, 10 mm, 25 mm, 50 mm, 100 mm, or 250 mm.

In some embodiments, the positioning region bounded on three sides by xy reference surface 102, yz reference surface 104, and xz reference surface 106 may have a z-dimensional height of less than or equal to 0.5 µm, 1 µm, 10 µm, 100 µm, 500 µm, 1 mm, 5 mm, 9 mm, or 10 mm. In some embodiments, the positioning region bounded on three sides by xy reference surface 102, yz reference surface 104, and xz reference surface 106 may have a z-dimensional height of greater than or equal to 0.5 µm, 1 µm, 10 µm, 100 µm, 500 µm, 1 mm, 5 mm, 9 mm, or 10 mm.

In some embodiments, the positioning region bounded on three sides by xy reference surface 102, yz reference surface 104, and xz reference surface 106 may have an x-dimensional length of less than or equal to 5 µm, 10 um, 50 µm, 100 µm, 500 µm, 1 mm, 10 mm, 50 mm, 99 mm, or 100 mm. In some embodiments, the positioning region bounded on three sides by xy reference surface 102, yz reference surface 104, and xz reference surface 106 may have an x-dimensional length of greater than or equal to 5 µm, 10 um, 50 µm, 100 µm, 500 µm, 1 mm, 10 mm, 50 mm, 99 mm, or 100 mm.

In some embodiments, the positioning region bounded on three sides by xy reference surface 102, yz reference surface 104, and xz reference surface 106 may have a y-dimensional length of less than or equal to 5 µm, 10 um, 50 µm, 100 µm, 500 µm, 1 mm, 10 mm, 50 mm, 99 mm, or 100 mm. In some embodiments, the positioning region bounded on three sides by xy reference surface 102, yz reference surface 104, and xz reference surface 106 may have a y-dimensional length of greater than or equal to 5 µm, 10 um, 50 µm, 100 µm, 500 µm, 1 mm, 10 mm, 50 mm, 99 mm, or 100 mm.

In some embodiments, one or more of grooves 110 may have a groove depth of less than or equal to 0.5 µm, 1 µm, 10 µm, 100 µm, 500 µm, 1 mm, 5 mm, or 10 mm. In some embodiments, one or more of grooves 110 may have a groove depth of greater than or equal to 0.5 µm, 1 µm, 10 µm, 100 µm, 500 µm, 1 mm, 5 mm, or 10 mm.

In some embodiments, one or more of grooves 110 may have a groove width of less than or equal to 0.5 µm, 1 µm, 10 µm, 100 µm, 500 µm, 1 mm, 5 mm, or 10 mm. In some embodiments, one or more of grooves 110 may have a groove width of greater than or equal to 0.5 µm, 1 µm, 10 µm, 100 µm, 500 µm, 1 mm, 5 mm, or 10 mm.

In some embodiments, two or more of grooves 110 may be spaced apart from one another by a spacing distance of less than or equal to 0.5 µm, 1 µm, 10 µm, 100 µm, 500 µm, 1 mm, 5 mm, or 10 mm. In some embodiments, two or more of grooves 110 may be spaced apart from one another by a spacing distance of greater than or equal to 0.5 µm, 1 µm, 10 µm, 100 µm, 500 µm, 1 mm, 5 mm, or 10 mm.

In some embodiments, any one of grooves 110 may be spaced laterally from yz reference plane 104 by a spacing distance of less than or equal to 0.5 µm, 1 µm, 10 µm, 100 µm, 500 µm, 1 mm, 5 mm, 10 mm, or 25 mm. In some embodiments, any one of grooves 110 may be spaced laterally from yz reference plane 104 by a spacing distance of greater than or equal to 0 µm, 0.5 µm, 1 µm, 10 µm, 100 µm, 500 µm, 1 mm, 5 mm, 10 mm, or 25 mm.

In some embodiments, one or more surfaces of optical bench 101, including but not limited to xy reference surface 102, may have a z-dimensional envelope requirement of less than or equal to +1 nm, +10 nm, +50 nm, +100 nm, +500 nm, +1 µm, +10 µm, +50 µm, +100 µm, or +250 µm. In some embodiments, one or more surfaces of optical bench 101, including but not limited to xy reference surface 102, may have a z-dimensional envelope requirement of greater than or equal to +1 nm, +10 nm, +50 nm, +100 nm, +500 nm, +1 µm, +10 µm, +50 µm, +100 µm, or +250 µm. In some embodiments, one or more surfaces of optical bench 101, including but not limited to xy reference surface 102, may have a z-dimensional envelope requirement of less than or equal to −1 nm, −10 nm, −50 nm, −100 nm, −500 nm, −1 µm, −10 µm, −50 µm, −100 µm, or −250 µm. In some embodiments, one or more surfaces of optical bench 101, including but not limited to xy reference surface 102, may have a z-dimensional envelope requirement of greater than or equal to −1 nm, −10 nm, −50 nm, −100 nm, −500 nm, −1 µm, −10 µm, −50 µm, −100 µm, or −250 µm.

In some embodiments, one or more surfaces of optical bench 101, including but not limited to yz reference surface 104, may have an x-dimensional envelope requirement of less than or equal to +1 nm, +10 nm, +50 nm, +100 nm, +500 nm, +1 µm, +10 µm, +50 µm, +100 µm, or +250 µm. In some embodiments, one or more surfaces of optical bench 101, including but not limited to yz reference surface 104, may have an x-dimensional envelope requirement of greater than or equal to +1 nm, +10 nm, +50 nm, +100 nm, +500 nm, +1 µm, +10 µm, +50 µm, +100 µm, or +250 µm. In some embodiments, one or more surfaces of optical bench 101, including but not limited to yz reference surface 104, may have an x-dimensional envelope requirement of less than or equal to −1 nm, −10 nm, −50 nm, −100 nm, −500 nm, −1 µm, −10 µm, −50 µm, −100 µm, or −250 µm. In some embodiments, one or more surfaces of optical bench 101, including but not limited to yz reference surface 104, may have an x-dimensional envelope requirement of greater than or equal to −1 nm, −10 nm, −50 nm, −100 nm, −500 nm, −1 µm, −10 µm, −50 µm, −100 µm, or −250 µm.

In some embodiments, one or more surfaces of optical bench 101, including but not limited to xz reference surface 106, may have a y-dimensional envelope requirement of less than or equal to +1 nm, +10 nm, +50 nm, +100 nm, +500 nm, +1 µm, +10 µm, +50 µm, +100 µm, +250 µm, +500 µm, +1 mm, or +5 mm. In some embodiments, one or more surfaces of optical bench 101, including but not limited to xz reference surface 106, may have a y-dimensional envelope requirement of greater than or equal to +1 nm, +10 nm, +50 nm, +100 nm, +500 nm, +1 µm, +10 µm, +50 µm, +100 µm, +250 µm, +500 µm, +1 mm, or +5 mm. In some embodiments, one or more surfaces of optical bench 101, including but not limited to xz reference surface 106, may have a y-dimensional envelope requirement of less than or equal to −1 nm, −10 nm, −50 nm, −100 nm, −500 nm, −1 µm, −10 µm, −50 µm, −100 µm, −250 µm, −500 µm, −1 mm, or −5 mm. In some embodiments, one or more surfaces of optical bench 101, including but not limited to xz reference surface 106, may have a y-dimensional envelope requirement of greater than or equal to −1 nm, −10 nm, −50 nm, −100 nm, −500 nm, −1 µm, −10 µm, −50 µm, −100 µm, −250 µm, −500 µm, −1 mm, or −5 mm.

In some embodiments (e.g., as is consistent with the exemplary envelope requirements set out above), an envelope requirement for an optical bench surface may be narrower in a direction transverse to optical propagation of light (e.g., the x direction and z direction for optical bench 101) than for a direction of optical propagation (e.g., the y direction for optical bench 101).

In some embodiments, any surface of optical bench 101 may have an envelope tolerance in a dimension perpendicular to the plane of the surface of less than or equal to +1 nm, +10 nm, +50 nm, +100 nm, +500 nm, +1 µm, +10 µm, +50 µm, +100 µm, +250 µm, +500 µm, +1 mm, or +5 mm. In some embodiments, any surface of optical bench 101 may have an envelope tolerance in a dimension perpendicular to the plane of the surface of greater than or equal to +1 nm, +10 nm, +50 nm, +100 nm, +500 nm, +1 µm, +10 µm, +50 µm, +100 µm, +250 µm, +500 µm, +1 mm, or +5 mm. In some embodiments, any surface of optical bench 101 may have an envelope tolerance in a dimension perpendicular to the plane of the surface of less than or equal to −1 nm, −10 nm, −50 nm, −100 nm, −500 nm, −1 µm, −10 µm, −50 µm, −100 µm, −250 µm, −500 µm, −1 mm, or −5 mm. In some embodiments, any surface of optical bench 101 may have an envelope tolerance in a dimension perpendicular to the plane of the surface of greater than or equal to −1 nm, −10 nm, −50 nm, −100 nm, −500 nm, −1 µm, −10 µm, −50 µm, −100 µm, −250 µm, −500 µm, −1 mm, or −5 mm.

In some embodiments, micro-optical bench 101 may be formed from one or more materials including but not limited to silicon, various glasses, fused silica, quartz, lithium niobate, ceramic, polymer (e.g. acrylic, PMMA, polycarbonate, COC, COP, etc.), thermoplastic, photoresist, or any combination of one or more thereof.

In some embodiments, micro-optical bench 101 may be formed by microfabrication. In some embodiments, one or more of reference surfaces 102, 104, and 106 may be formed through one or more optical lithography steps followed by one or more etching steps. For example, the reference surfaces may be formed by a first optical lithography step followed by deep reactive ion etching (DRIE). In some embodiments, a single mask and etch step may precisely define an optical origin point (e.g., the intersection point between the xy reference surface 102, yz reference surface 104, and xz reference surface 106) in space in addition to defining one or more planes corresponding to the reference surfaces 102, 104, and 106 to be formed. In some embodiments, a second optical lithography step, relative to the first, may then be performed and may be followed by a second etching step to form the grooves 110 at a precisely-defined distance from the yz reference surface 104. In some embodiments, the second etching step may be a wet chemical etching (e.g., KOH etching). In some embodiments, the second etching step may be a timed etching step and/or a monitored etching step configured to achieve a desired etch dimensions.

In some embodiments, fabrication of micro-optical bench 101 may include etching into and/or through a multi-layer coating to form micro-optical bench 101. For example, different layers in a substrate may be selectively removable by using different chemical reactions, such that a top layer may be removed without removing the next later layer, and then the next layer may then be removed without removing the third layer, and so on. This may allow for precise control of etch depth by allowing for the desired number of layers (and only the desired number of layers) to be removed, and inherently makes the micro-optical bench reconfigurable. For example, alternating layers of silicon nitride and silicon oxide may be removed selectively via phosphoric and hydrofluoric acid respectively.

In some embodiments, fabrication of micro-optical bench 101 may include performing one or more chemical etching steps for an amount of time that is specifically selected to achieve a desired etch depth, with longer etch times resulting in a deeper etch.

In some embodiments, micro-optical bench 101 may be formed from a single monolithic body, such as when using one or more lithography and/or etching techniques such as those described above. In some embodiments, micro-optical bench 101 may be formed from multiple sub-components, such as reconfigurable pieces that together form the body of micro-optical bench 101.

In some embodiments of a reconfigurable, multi-piece micro-optical bench 101, the body of micro-optical bench 101 may be formed from three physically separate components including (1) a base component forming xy reference surface 102, (2) a first wall component forming yz reference surface 104, and (3) a second wall component forming xz reference surface 106. In some embodiments, the second wall component may also include grooves 110, and one or more of the first wall component and the second wall component may form secondary component surface 108 (e.g., the surface raised above xy reference surface 102). In some embodiments, a system may include a set of different base components and/or different wall components that may be selected from and may be interchanged with one another to form a micro-optical bench having dimensions desired for a specific application. For example, the wall z-dimensional height of xy reference surface 102 and/or xz reference surface 106 may be varied by selecting different interchangeable first or second wall components, or the distance of grooves 110 from yz reference surface 104 may be varied by selecting different interchangeable first or second wall components.

In some embodiments, interchangeable components may allow for precise control of the location and orientation of component alignment features such as grooves 110, while allowing for other components such as the base component and first wall component to be fabricated without the need for precise z-dimensional thickness control. Thus, precision fabrication techniques (e.g., precision etching) may only be necessary for some components of micro-optical bench 101, as opposed to for all components of micro-optical bench 101, thereby increasing ease of fabrication and decreasing cost and time of fabrication.

In some embodiments, interchangeable components may be used to vary one or more characteristics of micro-optical bench 101 other than physical dimensions, including any of the characteristics discussed elsewhere herein, including but not limited to fabrication material, surface smoothness, surface shape, surface indentations, presence and/or location of one or more staggered reference surfaces, presence and/or location of one or more optical components (e.g., lenses), presence and/or location of one or more through-holes, presence and/or location of one or more electrical connectors, and/or presence and/or location of one or more physical mating structures.

In some embodiments, micro-optical bench 101 may be configured to receive one or more micro-shims that may elevate a component (e.g., a die) placed on xy reference surface 102. In some embodiments, a micro-shim may comprise an adhesive backing to adhere it to xy reference surface 102 such that a die or other component may be placed thereon. In some embodiments, one or more micro-shims may be stacked atop one another. In some embodiments, micro-shims may allow for micro-optical bench 101 to be used with different components (e.g., different dies) having different z-directional heights.

In some embodiments, micro-optical bench 101 may be formed by precision machining.

Figure 2A:
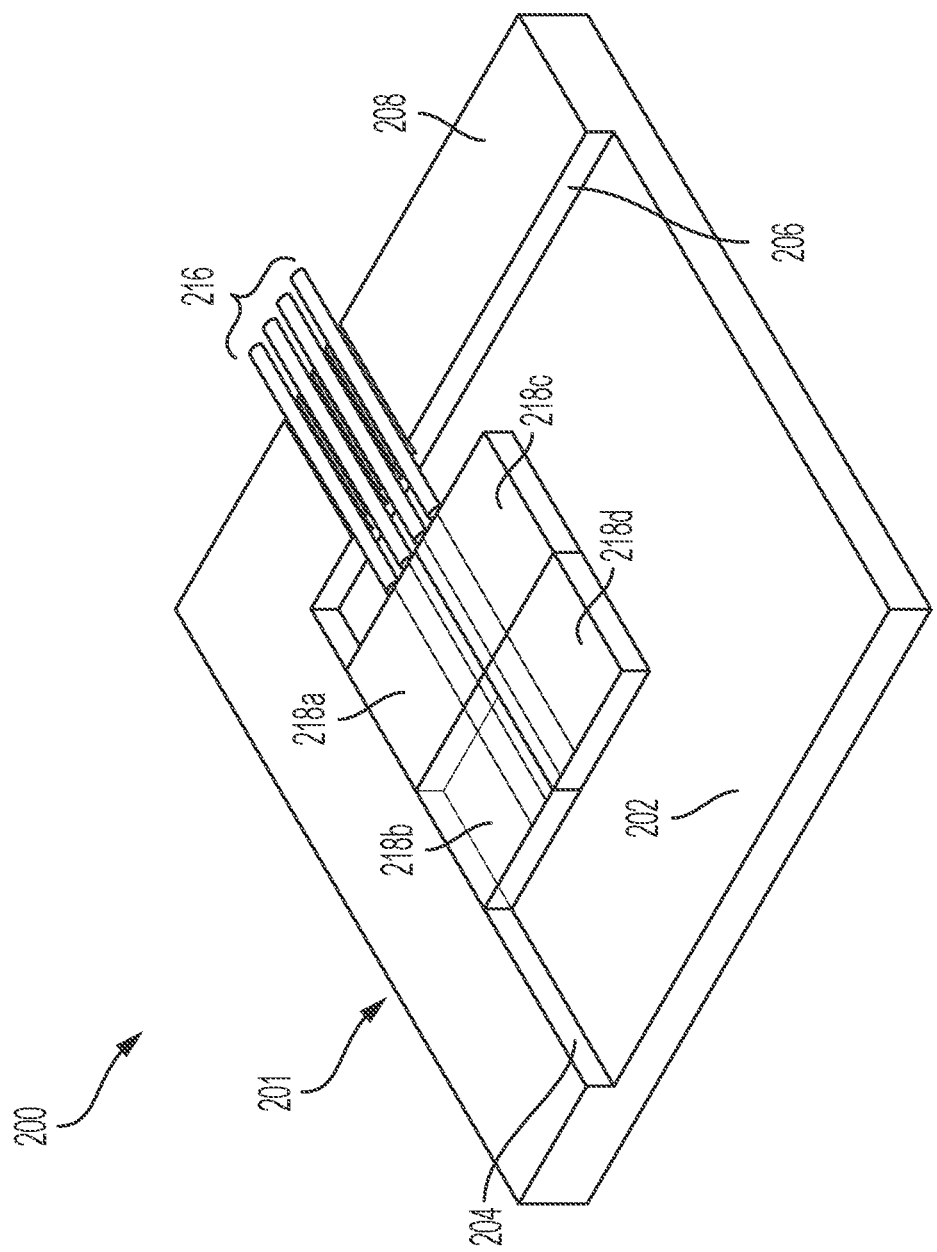
FIGS. 2A and 2B depict a photonic system assembly system for aligning dies and fibers, in accordance with some embodiments.
Figure 2B:
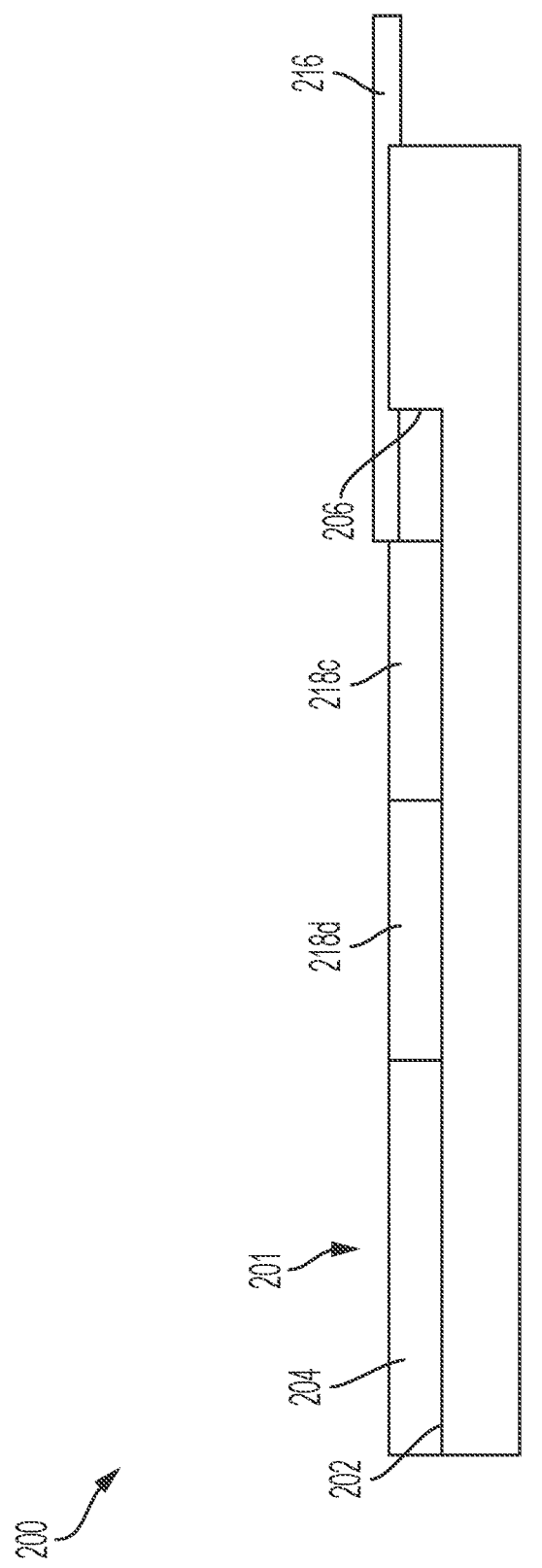

FIGS. 2A and 2B depict a photonic system assembly system 200 for aligning dies and fibers, in accordance with some embodiments. While the alignment systems shown herein primarily contemplate aligning dies and/or fibers, it should be appreciated that any components of optical systems (including but not limited to photonic modules, lenses, and photonic integrated circuits) may be aligned in accordance with the techniques disclosed herein. As shown, system 200 may include micro-optical bench 201 as well as fibers 216 and dies 218a-d. In some embodiments, micro-optical bench 201 comprises xy reference surface 202, yz reference surface 204, xz reference surface 206, and fixed component surface 208. In some embodiments, micro-optical bench 201 and its components may share any one or more characteristics in common with micro-optical bench 101 and its corresponding components.

Fibers 216 may be any suitable optical fibers for optical coupling with dies 218a-218d. In some embodiments, fibers 216 may be positioned in v-shaped grooves of micro-optical bench 201 (not visible in FIGS. 2A and 2B), which may share any one or more characteristics in common with grooves 110 discussed above with respect to FIGS. 1A and 1B. In some embodiments, one or more of fibers 216 may be bonded to (e.g., fixed with) a groove in which it is positioned (or otherwise bonded to or fixed to micro-optical bench 201); alternately or additionally, one or more of fibers 216 may be loosely placed in a groove in which it is positioned such that it may slide along the groove while being laterally secured along its fiber axis by the groove.

In some embodiments, one or more of fibers 216 may be made from silicon oxide, doped silicon oxide (e.g. Fluorine, Germanium, Erbium doped), plastics (acrylic, PMMA, polycarbonate, COC, COP, etc.), and/or a combination of any one or more thereof.

In some embodiments, one or more of fibers 216 may have a diameter of less than or equal to 5 µm, 10 µm, 100 µm, 500 µm, 1 mm, 5 mm, or 10 mm. In some embodiments, one or more of fibers 216 may have a diameter of greater than or equal to 5 µm, 10 µm, 100 µm, 500 µm, 1 mm, 5 mm, or 10 mm.

Dies 218a-218d may be positioned in any suitable arrangement on positioning surface 102, as discussed herein. In some embodiments, any one or more of dies 218a-218d may be positioned in any orientation with respect to positioning surface 102 and to optical or electrical components of the respective die(s). For example, a waveguide surface (e.g., a "top" surface) of a die may in some embodiments be placed against positioning surface 102, such that the die is positioned "upside down" on micro-optical bench 201.

Dies 218a-218d may be any suitable dies for integration into a photonic system such as a photonic integrated circuit, including dies fabricated using laser-based dicing techniques such as those discussed above. In some embodiments, one or more of dies 218a-218d may comprise any number of optical elements including but not limited to waveguides, micro-optical elements (e.g. lenses), amplification stages, mach-zender interferometers, ring resonators, sensing regions, photodetectors, interference structures, modulators, multiplexers, demultiplexers, lasers (tunable, supercontinuum, fabry perot, etc.), polarization controllers, filters, refectors, etc. In some embodiments, to prevent or minimize reflections, one or more of dies 218a-218d may be antireflection coated after singulation.

In some embodiments, the positioning/alignment/coupling techniques disclosed herein may facilitate the fabrication of photonic systems comprising a plurality of dies formed from different materials. For example, dies 218a-218d may each be formed from a different material and may together form a heterogeneous photonic system (such as a heterogeneous photonic integrated circuit). In some embodiments, one or more of dies 218a-218d may comprise silicon, sapphire, gallium arsenide, glass, lithium tantalite, silicon carbide, lithium niobate, quartz glass, borosilicate glass, gallium nitride, and/or indium phosphide. In some embodiments, one or more of dies 218a-218d may comprise one or more materials that are pre-fabricated, such as detectors, lasers, amplifiers, etc.

In some embodiments, dies 218a-218d may have a z-dimensional height of less than or equal to 1 µm, 5 µm, 10 µm, 100 µm, 500 µm, 1 mm, 5 mm, or 10 mm. In some embodiments, dies 218a-218d may have a z-dimensional height of greater than or equal to 1 µm, 5 µm, 10 µm, 100 µm, 500 µm, 1 mm, 5 mm, or 10 mm.

In some embodiments, dies 218a-218d may have an x-dimensional length of less than or equal to 10 µm, 50 µm, 100 µm, 500 µm, 1 mm, 10 mm, 25 mm, 50 mm, or 100 mm. In some embodiments, dies 218a-218d may have an x-dimensional length of greater than or equal to 10 µm, 50 µm, 100 µm, 500 µm, 1 mm, 10 mm, 25 mm, 50 mm, or 100 mm.

In some embodiments, dies 218a-218d may have a y-dimensional length of less than or equal to 10 µm, 50 µm, 100 µm, 500 µm, 1 mm, 10 mm, 25 mm, 50 mm, or 100 mm. In some embodiments, dies 218a-218d may have a y-dimensional length of greater than or equal to 10 µm, 50 µm, 100 µm, 500 µm, 1 mm, 10 mm, 25 mm, 50 mm, or 100 mm.

In some embodiments, one or more xy surfaces of one or more of dies 218a-218d may have a z-dimensional envelope requirement of less than or equal to +1 nm, +10 nm, +50 nm, +100 nm, +500 nm, +1 µm, +10 µm, +50 µm, +100 µm, or +250 µm. In some embodiments, one or more xy surfaces of one or more of dies 218a-218d may have a z-dimensional envelope requirement of greater than or equal to +1 nm, +10 nm, +50 nm, +100 nm, +500 nm, +1 µm, +10 µm, +50 µm, +100 µm, or +250 µm. In some embodiments, one or more xy surfaces of one or more of dies 218a-218d may have a z-dimensional envelope requirement of less than or equal to −1 nm, −10 nm, −50 nm, −100 nm, −500 nm, −1 µm, −10 µm, −50 µm, −100 µm, or −250 µm. In some embodiments, one or more xy surfaces of one or more of dies 218a-218d may have a z-dimensional envelope requirement of greater than or equal to −1 nm, −10 nm, −50 nm, −100 nm, −500 nm, −1 µm, −10 µm, −50 µm, −100 µm, or −250 µm.

In some embodiments, one or more yz surfaces of one or more of dies 218a-218d may have an x-dimensional envelope requirement of less than or equal to +1 nm, +10 nm, +50 nm, +100 nm, +500 nm, +1 µm, +10 µm, +50 µm, +100 µm, or +250 µm. In some embodiments, one or more yz surfaces of one or more of dies 218a-218d may have an x-dimensional envelope requirement of greater than or equal to +1 nm, +10 nm, +50 nm, +100 nm, +500 nm, +1 µm, +10 µm, +50 µm, +100 µm, or +250 µm. In some embodiments, one or more yz surfaces of one or more of dies 218a-218d may have an x-dimensional envelope requirement of less than or equal to −1 nm, −10 nm, −50 nm, −100 nm, −500 nm, −1 µm, −10 µm, −50 µm, −100 µm, or −250 µm. In some embodiments, one or more yz surfaces of one or more of dies 218a-218d may have an x-dimensional envelope requirement of greater than or equal to −1 nm, −10 nm, −50 nm, −100 nm, −500 nm, −1 μm, −10 μm, −50 μm, −100 μm, or −250 μm.

In some embodiments, one or more xz surfaces of one or more of dies 218a-218d may have a y-dimensional envelope requirement of less than or equal to +1 nm, +10 nm, +50 nm, +100 nm, +500 nm, +1 μm, +10 μm, +50 μm, +100 μm, +250 μm, +500 μm, +1 mm, or +5 mm. In some embodiments, one or more xz surfaces of one or more of dies 218a-218d may have a y-dimensional envelope requirement of greater than or equal to +1 nm, +10 nm, +50 nm, +100 nm, +500 nm, +1 μm, +10 μm, +50 μm, +100 μm, +250 μm, +500 μm, +1 mm, or +5 mm. In some embodiments, one or more xz surfaces of one or more of dies 218a-218d may have a y-dimensional envelope requirement of less than or equal to −1 nm, −10 nm, −50 nm, −100 nm, −500 nm, −1 μm, −10 μm, −50 μm, −100 μm, −250 μm, −500 μm, −1 mm, or −5 mm. In some embodiments, one or more xz surfaces of one or more of dies 218a-218d may have a y-dimensional envelope requirement of greater than or equal to −1 nm, −10 nm, −50 nm, −100 nm, −500 nm, −1 μm, −10 μm, −50 μm, −100 μm, −250 μm, −500 μm, −1 mm, or −5 mm.

In some embodiments (e.g., as is consistent with the exemplary envelope requirements set out above), an envelope requirement for a die surface may be narrower in a direction transverse to optical propagation of light (e.g., the x direction and z direction for dies 218a-218d) than for a direction of optical propagation (e.g., the y direction for dies 218a-218d).

In some embodiments, any surface of one or more of dies 218a-218d may have an envelope tolerance in a dimension perpendicular to the plane of the surface of less than or equal to +1 nm, +10 nm, +50 nm, +100 nm, +500 nm, +1 μm, +10 μm, +50 μm, +100 μm, +250 μm, +500 μm, +1 mm, or +5 mm. In some embodiments, any surface of one or more of dies 218a-218d may have an envelope tolerance in a dimension perpendicular to the plane of the surface of greater than or equal to +1 nm, +10 nm, +50 nm, +100 nm, +500 nm, +1 μm, +10 μm, +50 μm, +100 μm, +250 μm, +500 μm, +1 mm, or +5 mm. In some embodiments, any surface of one or more of dies 218a-218d may have an envelope tolerance in a dimension perpendicular to the plane of the surface of less than or equal to −1 nm, −10 nm, −50 nm, −100 nm, −500 nm, −1 μm, −10 μm, −50 μm, −100 μm, −250 μm, −500 μm, −1 mm, or −5 mm. In some embodiments, any surface of one or more of dies 218a-218d may have an envelope tolerance in a dimension perpendicular to the plane of the surface of greater than or equal to −1 nm, −10 nm, −50 nm, −100 nm, −500 nm, −1 μm, −10 μm, −50 μm, −100 μm, −250 μm, −500 μm, −1 mm, or −5 mm.

In some embodiments, dies may be provided in a right square prism shape or a right rectangular prism shape. In some embodiments, dies may be provided in a right prism shape that is not square or rectangular. In some embodiments, corners of dies may be removed such that the die may be more easily positioned in the corner defined by the intersection of the three reference surfaces 202, 204, and 206.

As shown, in some embodiments, fibers 216 may extend beyond fixed component surface 208, past xz reference surface 206, and into space over the positioning region above xy reference surface 202. This fiber overhang may, in some embodiments, allow the ends of fibers 216 to serve as a reference surface for alignment; for example, instead of dies 218a and 218c being pressed against xz reference surface 206, dies 218a and 218c may be pressed against the ends of one or more of fibers 216 to place the dies in their predetermined positions for alignment and coupling with fibers 216 and/or other optical components.

Additionally, a fiber overhang such as the overhang shown in FIGS. 2A and 2B may enable deformation in the portion of the one or more fibers that overhangs off of the ledge. For example, if a die is brought into alignment with a fiber and bonded (e.g., using adhesive) to that fiber, then a fiber overhang may allow for the fiber to thereafter bend freely in the overhanging open space. This may be useful in cases, for example, when there is a mismatch in coefficient of thermal expansion for a die and micro-optical bench 201 on which the fiber is mounted, changes in temperature may cause a change in relative position of the die and the portion of the fiber that is mounted in the groove of micro-optical bench 201. Thus, as the relative positions change, the overhanging portion of the fiber may be able to bend and to maintain the integrity of the bond with the die and maintain the integrity of the optical coupling of the fiber and the die.

In some embodiments, one or more of fibers 216 may overhang past xz reference surface 206 by a distance of less than or equal to 0.5 nm, 1 nm, 10 nm, 100 nm, 1 μm, 10 μm, 100 μm, 1 mm, 5 mm, or 10 mm. In some embodiments, one or more of fibers 216 may overhang past xz reference surface 206 by a distance of greater than or equal to 0.5 nm, 1 nm, 10 nm, 100 nm, 1 μm, 10 μm, 100 μm, 1 mm, 5 mm, or 10 mm.

Figure 3A:
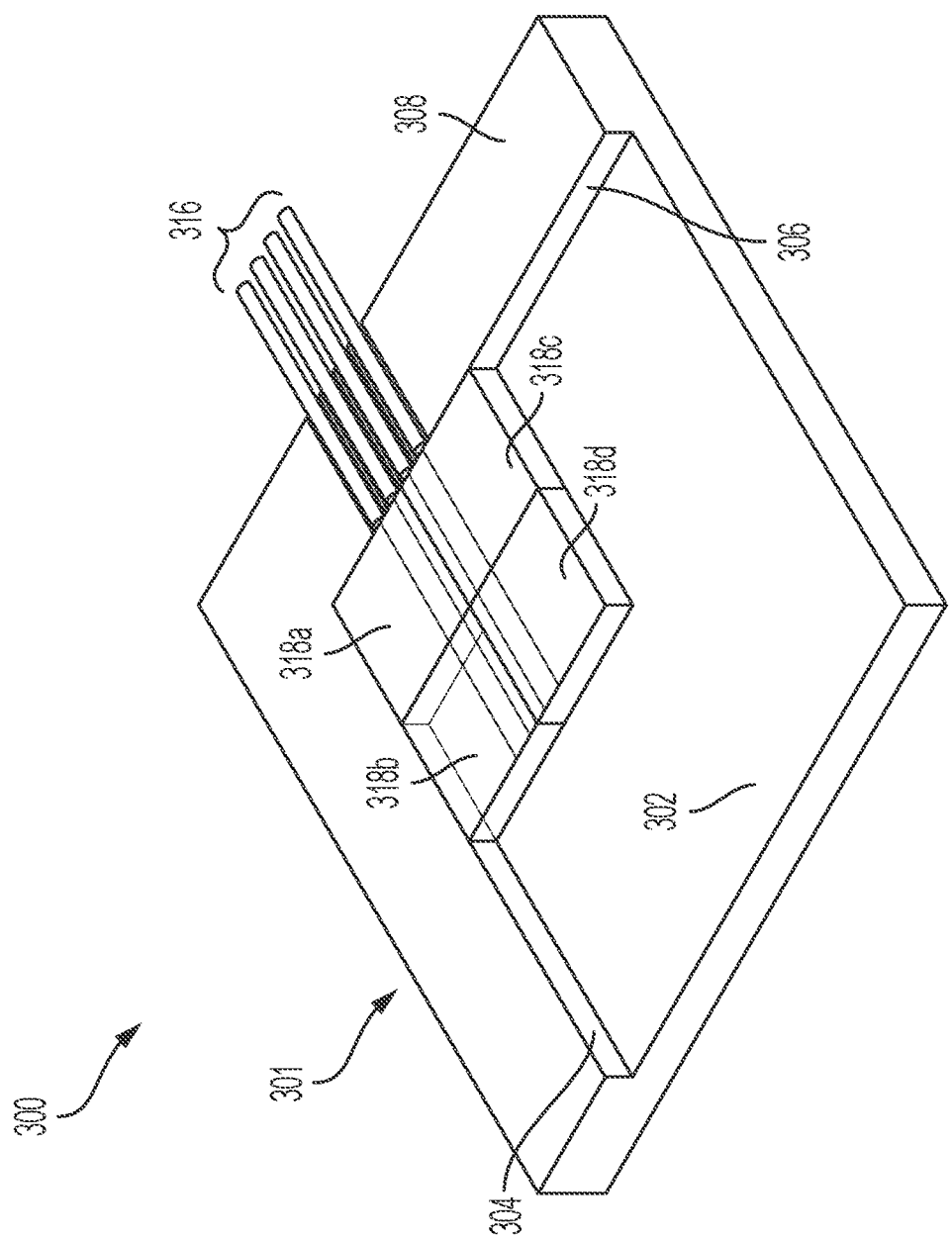
FIGS. 3A and 3B depict a photonic system assembly system for aligning dies and fibers with fiber ends flush with a reference surface of a micro-optical bench, in accordance with some embodiments.
Figure 3B:
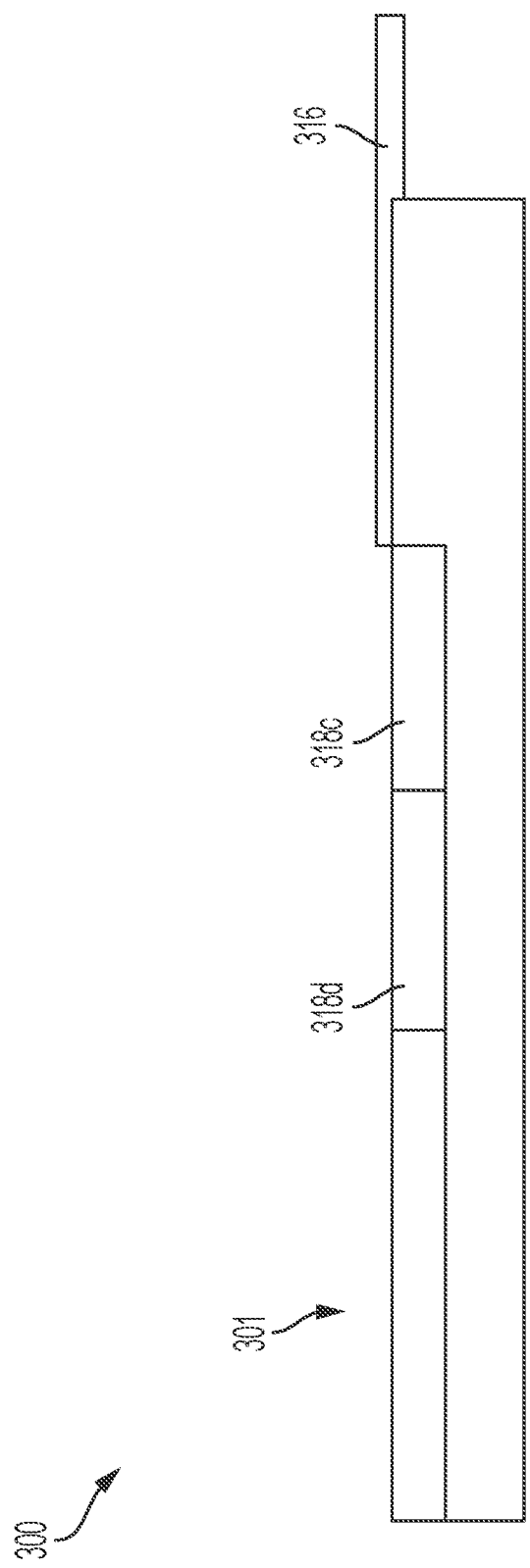

FIGS. 3A and 3B depict a photonic system assembly system 300 for aligning dies and fibers with fiber ends flush with a reference surface of a micro-optical bench, in accordance with some embodiments. As shown, system 300 may include micro-optical bench 301 as well as fibers 316 and dies 318a-d. In some embodiments, micro-optical bench 301 comprises xy reference surface 302, yz reference surface 304, xz reference surface 306, and fixed component surface 308. In some embodiments, micro-optical bench 301 and its components may share any one or more characteristics in common with micro-optical bench 101 and its corresponding components and/or micro-optical bench 201 and its corresponding components. In some embodiments, system 300 may share any one or more characteristics in common with system 200 and its corresponding components.

In some embodiments, system 300 may differ from system 200 in that system 300 may be configured such that the ends of one or more of fibers 316 are flush with xz reference surface 306, rather than overhanging past xz reference surface 306. Thus, rather than pressing dies 318a and 318c against the overhanging ends of fibers, dies 318a and 318c may be pressed in the y direction all the way toward and against xz reference surface 306, thus placing dies 318a and 318c in the correct predetermined positions/orientations for alignment and/or coupling with one or more other optical components (including but not limited to one or more of fibers 316).

Figure 4A:
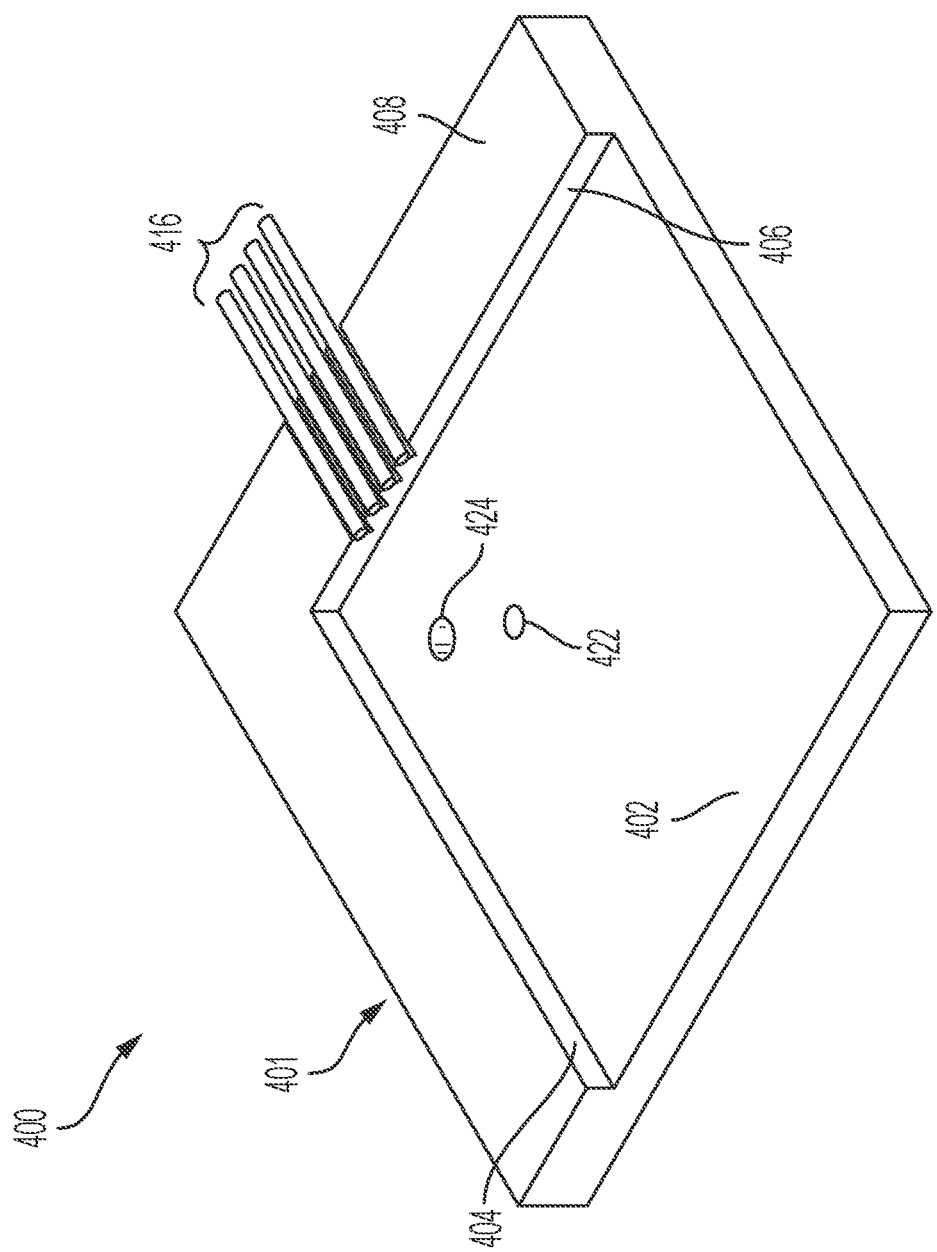
FIG. 4A depicts a photonic system assembly system for vertical integration, the system including a micro-optical bench configured for vertical light propagation, in accordance with some embodiments.
Figure 4B:
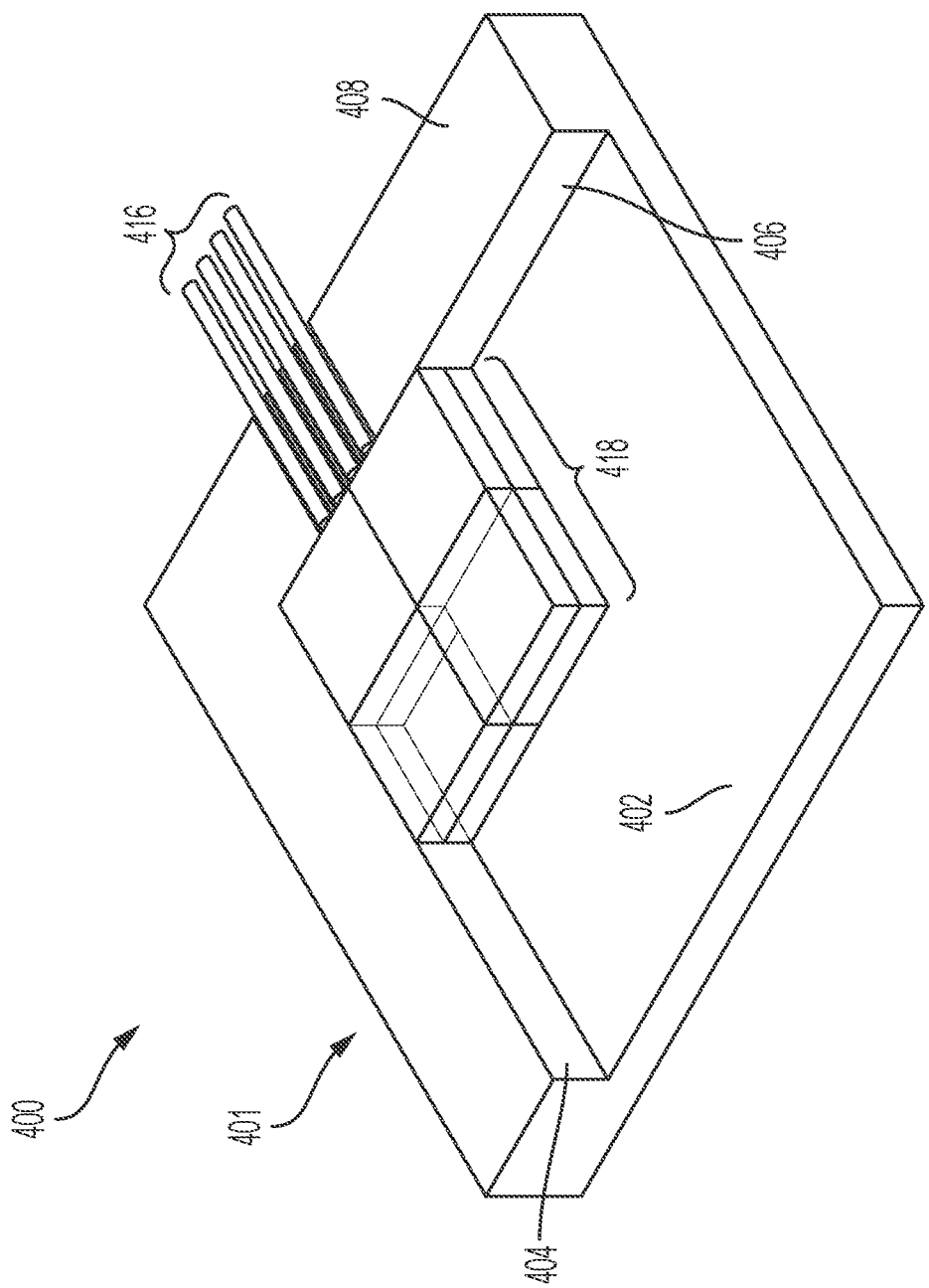
FIG. 4B depicts a photonic system assembly system for vertical integration, the system including a micro-optical bench configured for vertical die stacking, in accordance with some embodiments.
Figure 4C:
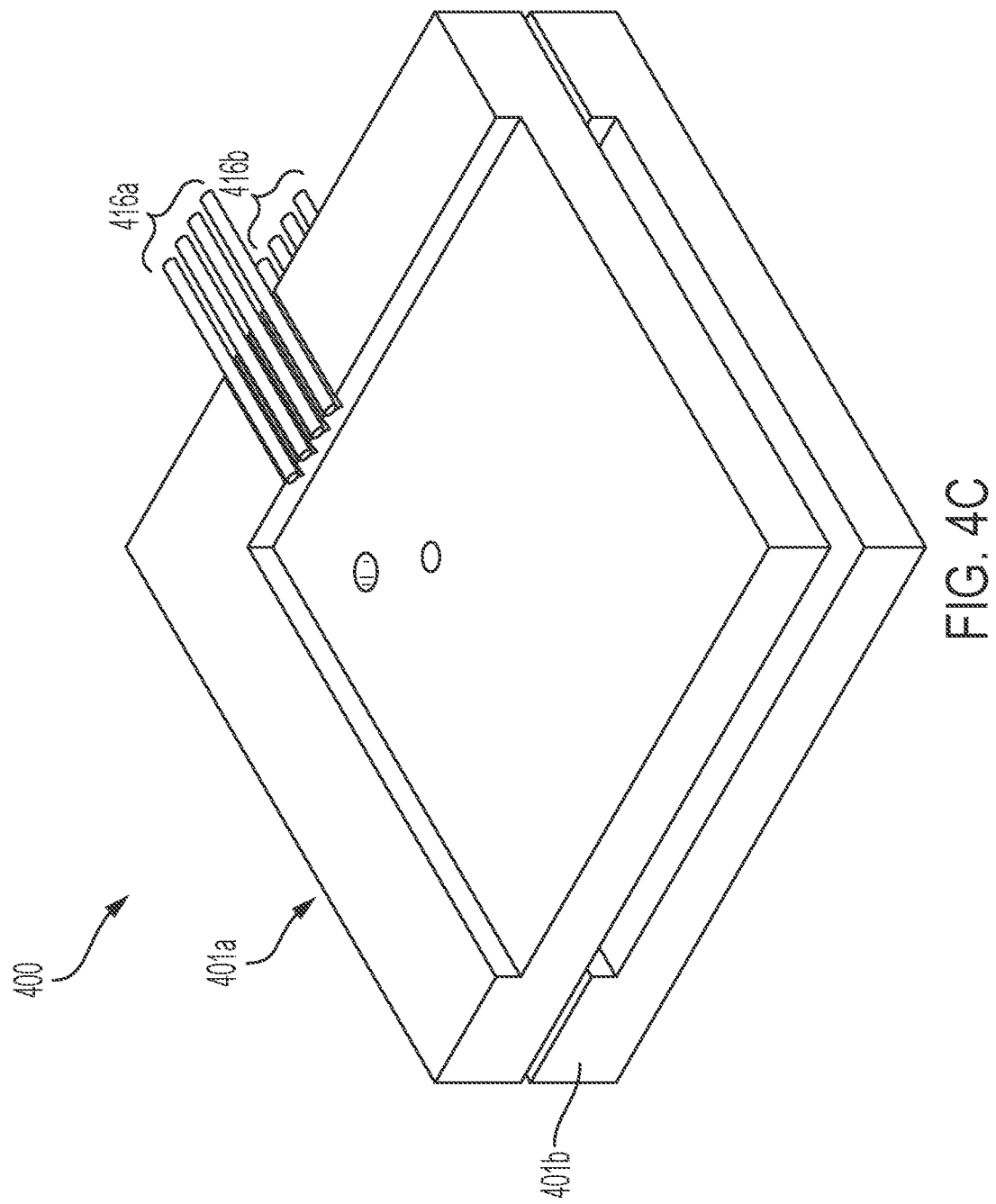
FIG. 4C depicts a photonic system assembly system for vertical integration, the system including two vertically-stacked micro-optical benches, in accordance with some embodiments.

FIGS. 4A-4C depict various embodiments of a photonic circuit assembly system 400 for vertical integration of one or more optical components.

FIG. 4A depicts an embodiment of photonic system assembly system 400 in which system 400 includes micro-optical bench 401 and in which micro-optical bench 401 is configured for vertical light propagation, in accordance with some embodiments. As shown, system 400 may include micro-optical bench 401 as well as fibers 416. In some embodiments, micro-optical bench 401 comprises xy reference surface 402, yz reference surface 404, xz reference surface 406, and fixed component surface 408. In some embodiments, micro-optical bench 401 and its components may share any one or more characteristics in common with micro-optical bench 101 and its corresponding components, micro-optical bench 201 and its corresponding components, and/or micro-optical bench 301 and its corresponding components. In some embodiments, system 400 may share any one or more characteristics in common with system 200 and its corresponding components and/or system 300 and its corresponding components.

The embodiment of micro-optical bench 401 shown in FIG. 4A may differ from micro-optical bench 101 in that the embodiment of micro-optical bench 401 may comprise one or more elements configured to facilitate the z-directional propagation of light within the system, such as by allowing the z-directional propagation of light through through-hole 422 and/or the z-directional propagation of light through lens 424. In some embodiments, system 400 may thus be configured such that positioning one or more components (e.g., dies) in the positioning area on xy reference surface 402 may cause the one or more components to align with and/or optically couple with light propagating in the z direction (such as by aligning with through-hole 422 and/or lens 424). In some embodiments, an optical fiber may be used in place of lens 424.

In some embodiments, in addition to or alternately to using through-holes and/or lenses for facilitating the z-directional propagation of light in the system, system 400 may use transparent substrate material for all or part of the body of micro-optical stage 401. Thus, for example, light may be able to propagate in the z direction through all or part of the portion of the body of micro-optical stage 401 underlying xy reference surface 402. In some embodiments, a transmissive microoptical bench can have prefabricated optical elements such as lenses or gratings pre-defined, and at optionally specific positions.

FIG. 4B depicts an embodiment of photonic system assembly system 400 in which system 400 includes micro-optical bench 401 and in which micro-optical bench 401 is configured for vertical die stacking, in accordance with some embodiments. The embodiment of micro-optical bench 401 may differ from micro-optical bench 101 in that the embodiment of micro-optical bench 401 may comprise a positioning area (bounded on three sides by xy reference surface 402, yz reference surface 404, and xz reference surface 406) that is configured to receive optical components (e.g., dies) that are stacked in the vertical direction. For example, yz reference surface 404 and/or xz reference surface 406 may extend further in the z-direction than described above with respect to micro-optical bench 101 (e.g., twice as far in the z-direction, five times as far in the z-direction, or ten times as far in the z-direction). In this manner, one or more dies or other components stacked on top of one another in the positioning area may be pressed against yz reference surface 404 and/or xz reference surface 406 without sliding over the upper edge of either of the reference surfaces. In the example shown in FIG. 4B, system 400 includes dies 418, which are stacked two-dies high in a 2×2×2 arrangement. Dies 418 may share any one or more characteristics in common with other dies described herein, and may be configured to optically couple with and/or otherwise interact with one another in a vertically-integrated manner (e.g., to receive and or transmit light through a top or bottom z-directional surface).

FIG. 4C depicts an embodiment of photonic system assembly system 400 in which system 400 includes two micro-optical benches 401a and 401b, each with a corresponding set of fibers 416a and 416b, in accordance with some embodiments. In some embodiments, an arrangement with stacked micro-optical benches may provide additional functionality as the stacking of benches on top of one another may allow for separate fabrication of components on each bench and subsequent combination of modules (or packaged elements). Furthermore, stacking of benches may act as a coordinate transform from one bench reference plane to another, allowing for non-standard spacings/alignment of elements in the top optical bench to the next optical bench in the stack.

Figure 5:
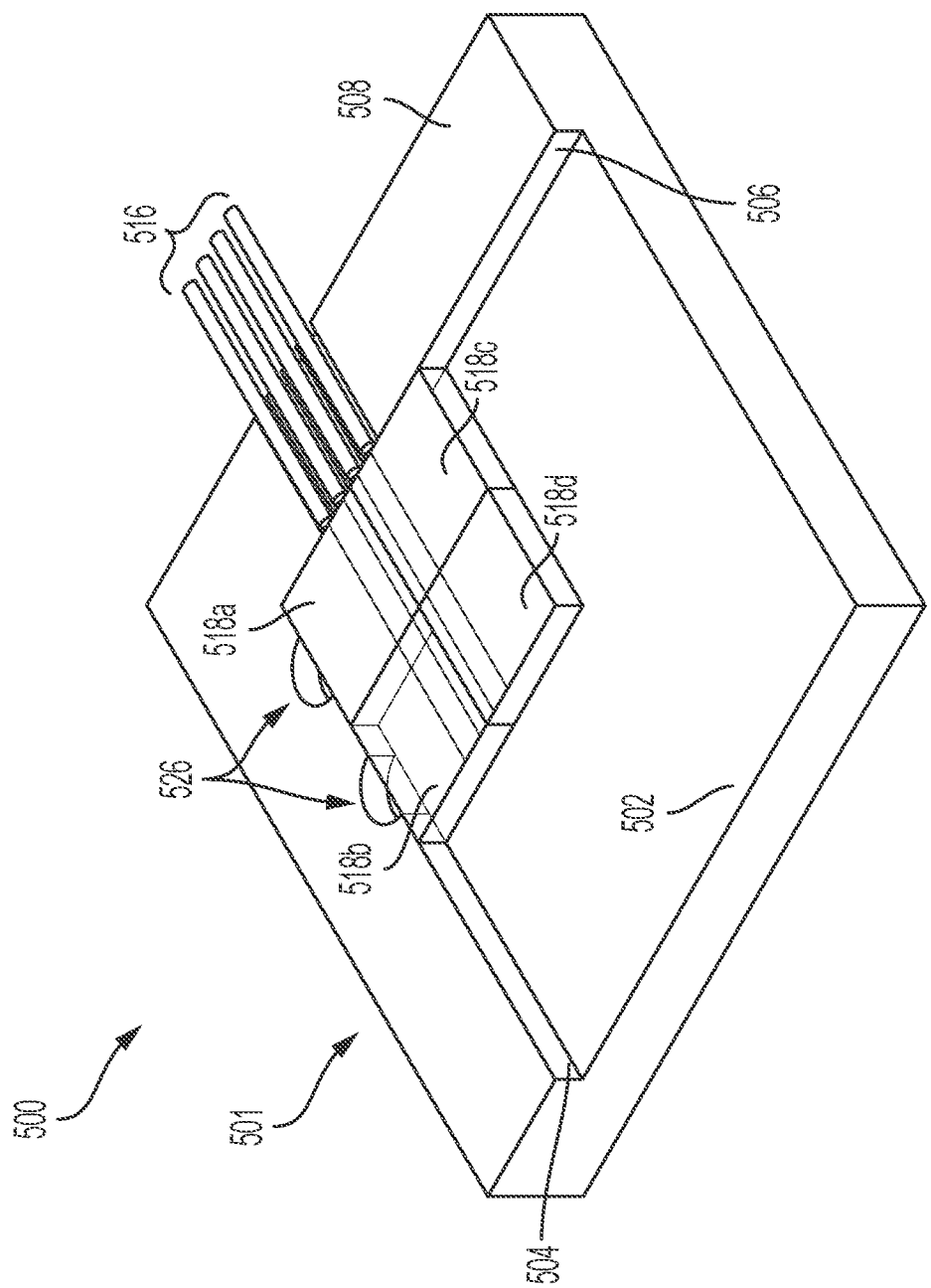
FIG. 5 depicts a photonic system assembly system, the system including a micro-optical bench having indentations on a reference surface, in accordance with some embodiments.

FIG. 5 depicts a photonic system assembly system 500, the system including micro-optical bench 501 having indentations on a reference surface, in accordance with some embodiments. As shown, system 500 may include micro-optical bench 501 as well as fibers 516 and dies 518a-d. In some embodiments, micro-optical bench 501 comprises xy reference surface 502, yz reference surface 504, xz reference surface 506, and fixed component surface 508. In some embodiments, micro-optical bench 501 and its components may share any one or more characteristics in common with micro-optical bench 101 and its corresponding components, micro-optical bench 201 and its corresponding components, micro-optical bench 301 and its corresponding components, and/or micro-optical bench 401 and its corresponding components. In some embodiments, system 500 may share any one or more characteristics in common with system 200 and its corresponding components, system 300 and its corresponding components, and/or system 400 and its corresponding components.

In some embodiments, micro-optical bench 501 may differ from micro-optical bench 101 in that micro-optical bench 501 may comprise one or more indentations formed in one or more of its reference surfaces, such as indentations 526 formed in yz reference surface 504.

In some embodiments of placing two objects in physical contact with one another, it may be advantageous for alignment to contact reference surfaces as little as possible so as to avoid contact with a portions of the surface that are not perfectly flat, such as imperfections in the surface. Thus, in some embodiments, one or more indentations such as indentations 526 may be used to reduce the amount of contact between a reference surface and an optical component being positioned against it. In some embodiments, one or more indentations in a reference surface of micro-optical bench 501 may be formed by etching. In some embodiments, one or more indentations may be formed in any suitable location on any one or reference surfaces 502, 504, and/or 506; in some embodiments, one or more indentations may be formed on one or more surfaces of an optical component (e.g., a die) configured to be placed in contact with one or more reference surfaces of micro-optical bench 501.

In some embodiments, one or more of indentations 526 may be less than or equal to 5 nm, 10 nm, 100 nm, 1 μm, 10 μm, 100 μm, 1 mm, 10 mm, or 25 mm. In some embodiments, one or more of indentations 526 may be greater than or equal to 5 nm, 10 nm, 100 nm, 1 μm, 10 μm, 100 μm, 1 mm, 10 mm, or 25 mm. For smaller sized indentations, the indentations maybe a stippling.

Figure 6:
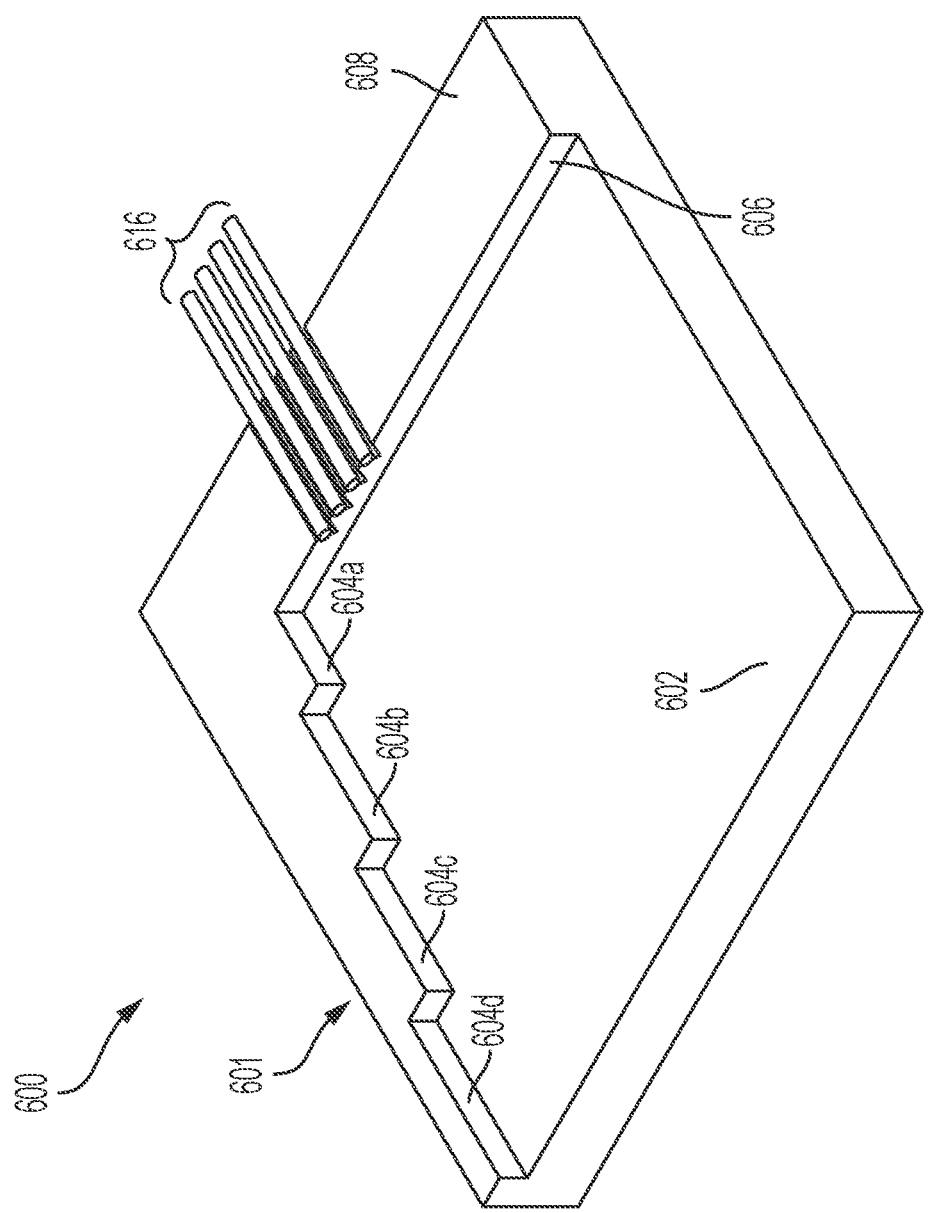
FIG. 6 depicts a photonic system assembly system, the system including a micro-optical bench having a plurality of staggered reference planes, in accordance with some embodiments.

FIG. 6 depicts a photonic system assembly system 600, the system 600 including a micro-optical bench 601 having a plurality of staggered reference planes, in accordance with some embodiments. As shown, system 600 may include micro-optical bench 601 as well as fibers 616. In some embodiments, micro-optical bench 601 comprises xy reference surface 602, yz reference surfaces 604a-d, xz reference surface 606, and fixed component surface 608. In some embodiments, micro-optical bench 601 and its components may share any one or more characteristics in common with micro-optical bench 101 and its corresponding components, micro-optical bench 201 and its corresponding components, micro-optical bench 301 and its corresponding components, micro-optical bench 401 and its corresponding components, and/or micro-optical bench 501 and its corresponding components. In some embodiments, system 600 may share any one or more characteristics in common with system 200 and its corresponding components, system 300 and its corresponding components, system 400 and its corresponding components, and/or system 500 and its corresponding components.

In some embodiments, micro-optical bench 601 may differ from micro-optical bench 101 in that micro-optical bench 601 may comprise a plurality of yz reference surfaces 604a-d rather than a single yz reference surface. In the embodiment shown, yz reference surfaces 604a-d are parallel and staggered in the x-direction from one another. In some embodiments, two or more staggered parallel reference surfaces may be useful in positioning optical components (e.g., dies) at different positions in a positioning region. In some embodiments, larger dies may be positioned against one staggered surface while smaller dies may be positioned against a different staggered surface. In some embodiments, staggered or otherwise laterally varied parallel reference surfaces may aid in the creation of different optical system geometries.

While the example of FIG. 6 shows staggered xz reference surfaces, in some embodiments a micro-optical stage may alternately or additionally comprise a plurality of staggered or otherwise laterally varied yz reference surfaces and/or a plurality of staggered or otherwise laterally varied xy reference surfaces.

Figure 7:
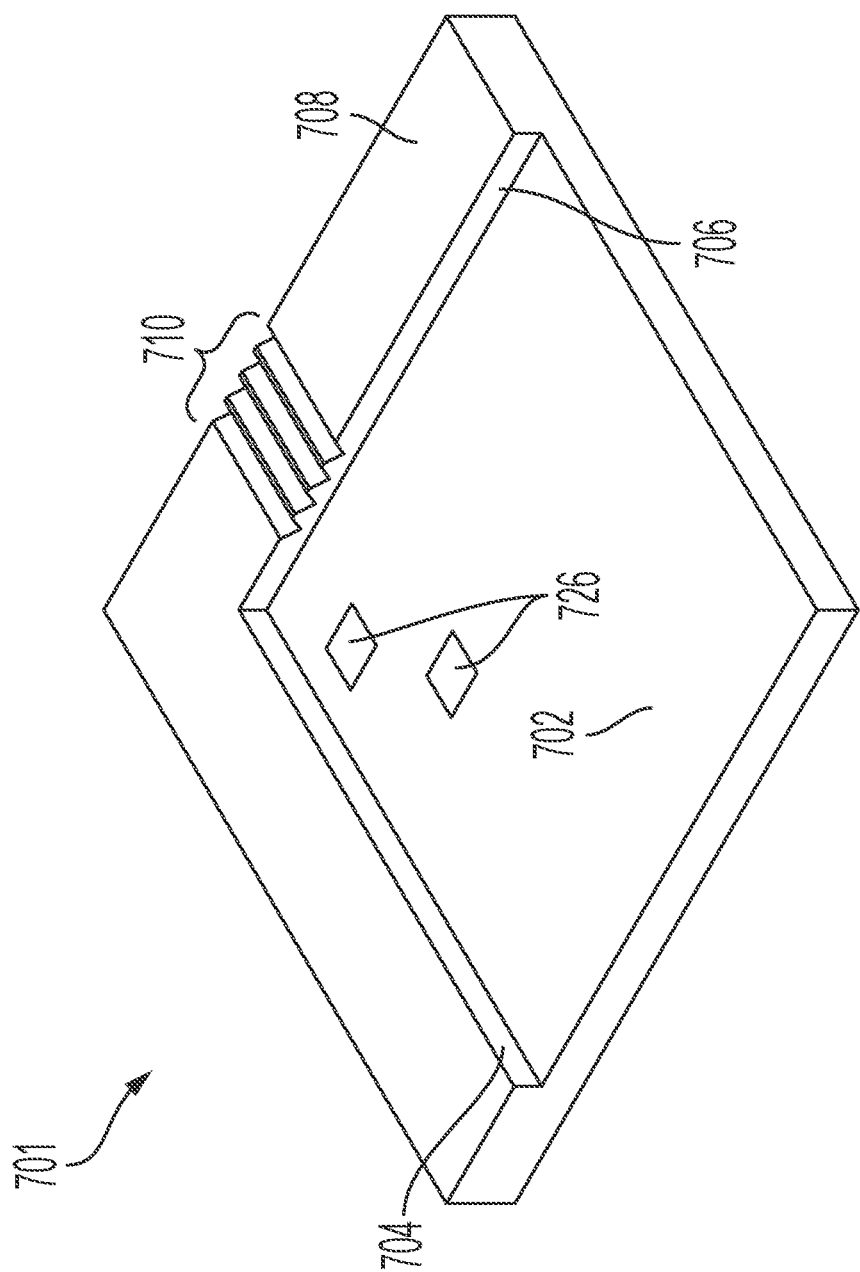
FIG. 7 depicts a micro-optical bench having a plurality of electrical connection pads, in accordance with some embodiments.

FIG. 7 depicts a micro-optical bench having a plurality of electrical connection pads, in accordance with some embodiments. In some embodiments, micro-optical bench 701 comprises xy reference surface 702, yz reference surface 704, xz reference surface 706, fixed component surface 708, and grooves 710. In some embodiments, micro-optical bench 701 and its components may share any one or more characteristics in common with micro-optical bench 101 and its corresponding components, micro-optical bench 201 and its corresponding components, micro-optical bench 301 and its corresponding components, micro-optical bench 401 and its corresponding components, micro-optical bench 501 and its corresponding components, and/or micro-optical bench 601 and its corresponding components.

In some embodiments, micro-optical bench 701 may differ from micro-optical bench 101 in that micro-optical bench 701 may comprise electrical connection pads 726 which are integrated into xy reference surface 702. In some embodiments, electrical connection pads 726 may be positioned on xy reference surface 702 such that they will align with one or more corresponding electrical interfaces on a component (e.g., a die) when the component is moved into its predetermined position in the positioning region of micro-optical bench 701 for alignment and/or coupling with one or more other components. In some embodiments, once the movable component is moved into its predetermined position for alignment/coupling and electrical connection pads 726 are electrically aligned with corresponding electrical connectors, electrical connection pads 726 may be bonded to corresponding electrical connectors, such as by using heating (e.g., local laser heating) and/or wire bonding to melt corresponding electrical connectors to one another.

While the example shown in FIG. 7 depicts electrical connectors integrated into xy reference surface 702, one or more electrical connectors may be alternately or additionally integrated into yz reference surface 704 and/or xz reference surface 706. One or more electrical connectors may be integrated into any surface of a die configured to be positioned in the positioning region of micro-optical stage 701, and electrical connectors integrated into one or more surfaces of dies may be configured to interface with one another and/or with electrical connectors of micro-optical stage 701.

Figure 8A:
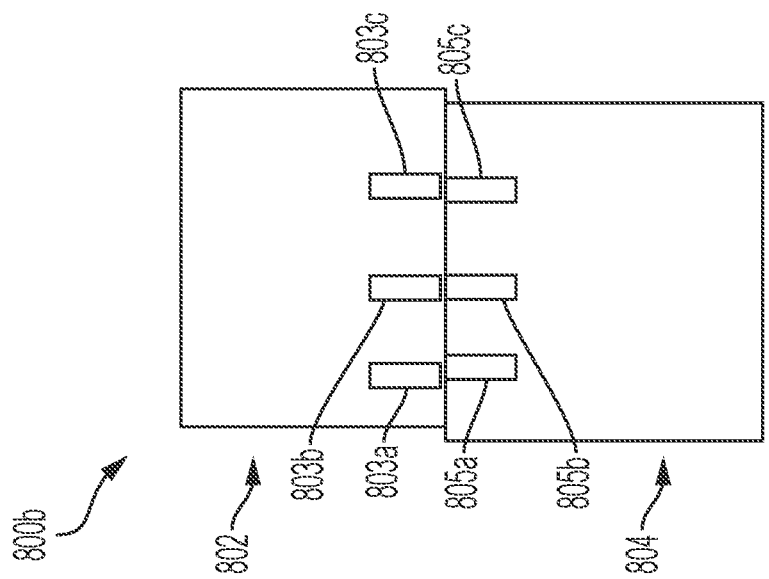
FIGS. 8A and 8B depict view of a component micro-adjustment system for making micro-adjustments to the relative positions of two components, in accordance with some embodiments.
Figure 8B:
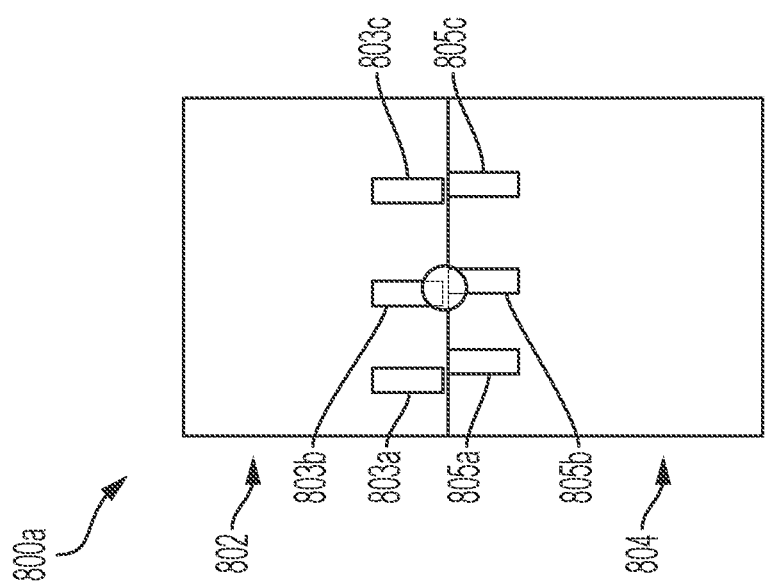

FIGS. 8A and 8B depict view of a component microadjustment system for making micro-adjustments to the relative positions of two components, in accordance with some embodiments. In some embodiments, the two components whose relative positions are adjusted may include one or more optical components such as one or more dies as discussed herein. In some embodiments, the two components whose relative positions are adjusted may include one or more micro-optical benches as discussed herein. In the example of FIGS. 8A and 8B, the relative positions of dies 802 and 804 are adjusted, with FIG. 8A showing an arrangement 800b before adjustment and FIG. 8B showing an arrangement 80b after adjustment.

As shown, die 802 comprises microadjustment tabs 803a, 803b, and 803c, while die 804 comprises respectively corresponding microadjustment tabs 805a, 805b and 805c. In some embodiments, one or more of the microadjustment tabs may be made from metal (e.g. lead, copper, silver, etc.). As shown in FIG. 8A, dies 802 and 804 may be placed adjacent to one another such that corresponding tabs 803a and 805a are offset from one another by a first distance (approximately three quarters of a tab width, in the example shown), tabs 803b and 805b are offset from one another by a second distance (approximately half of a tab width, in the example shown), and tabs 803c and 805c are offset from one another by a third distance (approximately one-quarter of a tab width, in the example shown). In some embodiments, the microadjustment tabs may be configured such that by selectively heating one of the corresponding pairs of tabs, the heated pair of tabs may be caused to move into alignment with one another, thereby causing the dies 802 and 804 to be relatively adjusted with respect to one another by a distance equal to the initial offset distance of the heated pair of tabs. In some embodiments, surface tension of combining bodies of liquid formed by melting the pair of tabs may cause realignment of the components by creating a force pulling the components into alignment. In the example of FIG. 8A, local laser heating is applied to tabs 803b and 805b, thereby causing the pair of tabs to move into alignment in FIG. 8B and causing die 802 to move to the right relative to die 804. In some embodiments, alternately or additionally to using local laser heating to heat a particular pair of tabs, delocalized heating may be used. In some embodiments of using delocalized heating, different pairs of tabs may have different melting temperatures such that pairs with lower melting temperatures may be melted without melting the other pairs in order to achieve the desired realignment attributable to the melted pair.

In some embodiments, in addition to or alternately to one or more of the alignment techniques described elsewhere herein, corresponding mating structures such as mating keys may be used to achieve proper relative positioning of optical components such as micro-optical benches and/or dies. For example, a die or other optical component may be fabricated with one or more alignment grooves or other mating structures etched into or otherwise formed as part of the die/component, and a corresponding (e.g., spatially reflecting) structure may be provided on a corresponding die/component and/or on a micro-optical bench. The corresponding structures (e.g., mating keys) may then be brought into alignment with one another to achieve a predefined spatial relationship between the components on which the corresponding structures are provided.

Figure 9B:
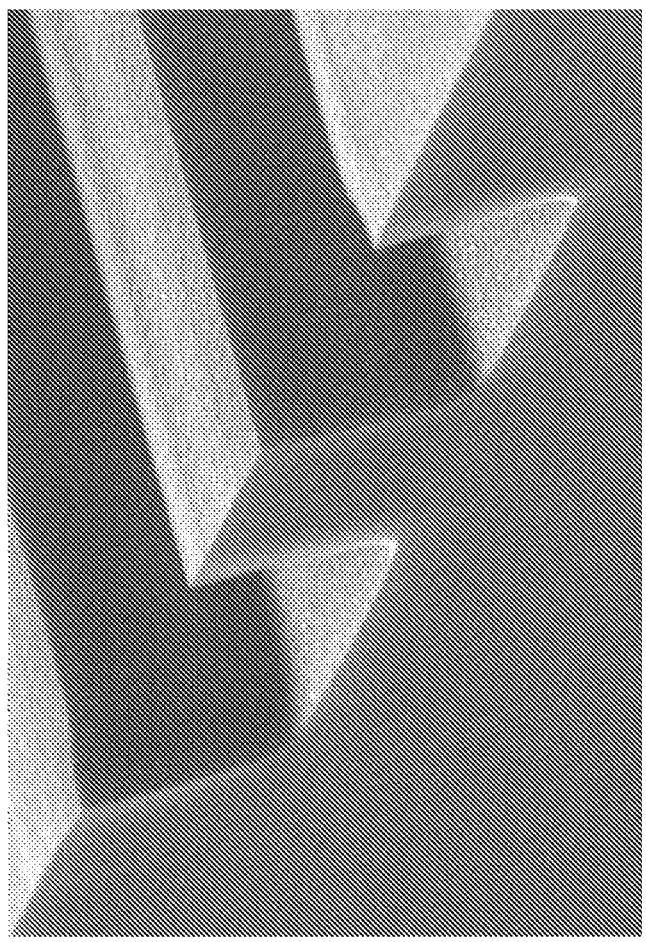
FIGS. 9A and 9B depict views of an optical facet of an optical component, in accordance with some embodiments.
Figure 9A:
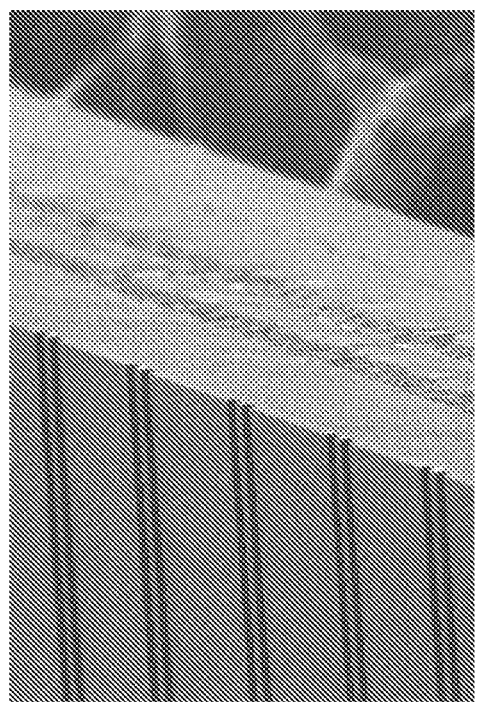

In some embodiments, one or more optical components for use in the alignment, coupling, and fabrication techniques disclosed herein may be formed using a laser-based wafer dicing technique configured to simultaneously (a) create a planar exterior surface of the die formed and (b) create an optical facet in the die formed. In some embodiments, process parameters of the laser-based wafer dicing may be tuned such that a clean optical facet is formed at an edge of a planar surface of the die. Parameters for optimization include depth of focus, focal plane, under and/or over correction of the optical aberrations of the system, smoothness of surface through which the laser beam passes, laser wavelength, substrate thickness, number of passes, proximity to optically absorbing and/or reflecting layers, patterning of damage (e.g. turning laser on and off during damaging/translation), etc. FIGS. 9A and 9B show views of a clean optical facet formed by 2-4 passes of a laser beam at 1064 nm wavelength, focused at least 10 μm from the surface containing optical waveguides, guide from the back of the wafer. FIG. 9A shows a first view of the surface containing optical waveguides and FIG. 9B shows a zoomed-in view of the optical facet of one of the optical waveguides. In an example of this, a laser at 1064 nm is focused inside the substrate more than 10 μm past the material, passing through the "back" side of the substrate (e.g., the side that is opposite the main optical features). The laser is moved along programmed path. The laser is then refocused, approximately 100 μm further towards the back of the wafer, and the programmed pattern is repeated. This process is continued until sufficient stress is created in the programmed pattern, through the depth of the substrate. Forming an optical facet in this manner may allow for direct coupling of optics (e.g., fibers) and dies to one another with minimal gap distance.

In some embodiments, the laser wavelength for optical facet formation is less than or equal to 900 nm, 1000 nm, 1100 nm, 1200 nm, 1300 nm, 1400 nm, or 1500 nm. In some embodiments, the laser wavelength for optical facet formation is greater than or equal to 900 nm, 1000 nm, 1100 nm, 1200 nm, 1300 nm, 1400 nm, or 1500 nm. In some embodiments, the laser wavelength for optical facet formation is 1064 nm. In some embodiments, the laser wavelength for optical facet formation is 1080 nm. In some embodiments, the laser wavelength for optical facet formation is 1099 nm.

In some embodiments the number of laser passes for optical facet formation is less than or equal to 2, 3, 4, 5, 6, 7, 8, 9, 10, 20, or 30. In some embodiments the number of laser passes is greater than or equal to 1, 2, 3, 4, 5, 6, 7, 8, 9, 10, 20, or 30.

In some embodiments the required amount of optical aberration correction for optical facet formation is less than or equal to 5 μm, 10 μm, 15 μm, 20 μm, 30 μm, 40 μm, 50 μm, 100 μm, or 200 μm. In some embodiments the required amount of optical aberration correction for optical facet formation is greater than or equal to 5 μm, 10 μm, 15 μm, 20 μm, 30 μm, 40 μm, 50 μm, 100 μm, or 200 μm. In some embodiments the required amount of optical aberration correction for optical facet formation is less than or equal to −5 μm, −10 μm, −15 μm, −20 μm, −30 μm, −40 μm, −50 μm, −100 μm, or −200 μm. In some embodiments the required amount of optical aberration correction for optical facet formation is greater than or equal to −5 μm, −10 μm, −15 μm, −20 μm, −30 μm, −40 μm, −50 μm, −100 μm, or −200 μm.

In some embodiments the first laser pass for optical facet formation may be focused within the substrate, below a surface containing optical features, at less than or equal to 100 nm, 500 nm, 1 μm, 5 μm, 10 μm, 50 μm, 100 μm, 200 μm, or 500 μm, or 1 mm. In some embodiments the first laser pass for optical facet formation may be focused within the substrate, below a surface containing optical features, at greater than or equal to 100 nm, 500 nm, 1 μm, 5 μm, 10 μm, 50 μm, 100 μm, 200 μm, 500 μm, or 1 mm.

In some embodiments the first laser pass for optical facet formation may be focused within the substrate, below the back surface of the substrate, at less than or equal to 100 nm, 500 nm, 1 μm, 5 μm, 10 μm, 50 μm, 100 μm, 200 μm, 500 μm, or 1 mm. In some embodiments the first laser pass for optical facet formation may be focused within the substrate, below the back surface of the substrate, at greater than or equal to 100 nm, 500 nm, 1 μm, 5 μm, 10 μm, 50 μm, 100 μm, 200 μm, 500 μm, or 1 mm.

In some embodiments, one or more optical components for use in the alignment, coupling, and fabrication techniques disclosed herein may be bonded to one another once aligned. For example, dies and/or fibers may be bonded to one another and/or may be bonded to a micro-optical bench. In some embodiments, adhesive such as low-expansion glue may be used to bond components. In some embodiments, two components may be bonded to one another by welding them together using a laser. A focused laser may create a region of molten material near the laser's point of focus; this effect may be seen in laser-based wafer dicing techniques. By focusing a laser on the interface between two components, the material near the interface in one or more of the components may be melted and then be allowed to re-solidify to bond the two components together with solid material. In some embodiments, this laser welding technique may be used with any of the component materials mentioned herein. In some embodiments, this laser welding technique may be particularly effective when the materials of the two components being bonded together are the same material, or when they include two materials where the melting temperature of neither material is above the vaporization temperature of the other (e.g., such that material from both components may be melted near the interface without vaporizing either material).

In some embodiments, one or more dies or other components positioned in accordance with the techniques disclosed herein may comprise one or more magnetic elements, such as magnetic material and/or an electromagnet. In some embodiments, one or more components positioned in accordance with the techniques disclosed herein may be formed from a magnetic material. In some embodiments, the one or more components comprising and/or formed from magnetic material may be positioned on a positioning surface at least in part by magnetic force. For example, magnetic force exerted between a plurality of components (e.g., dies) on a positioning surface may attract the two components toward one another and cause respective surfaces of the two components to contact one another. In another example, magnetic force may be exerted between a positionable component (e.g., a die) and a magnet or magnetic material provided as part of or positioned nearby a reference surface of a micro-optical bench; in this way, the magnetic force may cause the positionable component (e.g., the die) to be forced toward and against the reference surface.

In some embodiments, one or more active optical components (e.g., dies) may be positioned on a positioning surface in accordance with the techniques described herein, wherein one or more spacer components may be used in positioning the active optical component. For example, instead of forcing a die directly against a reference surface of a micro-optical bench, a spacer may be forced against the reference surface of the micro-optical bench and the die may be forced against the spacer opposite the reference surface, such that the spacer spaces the die a predefined distance from the reference surface. In some embodiments, a spacer may be an optically inert component such as an inactive component that may or may not be integrated into the optical system into which the die is integrated. In some embodiments, one or more spacers (spacing components from one or more reference surfaces) may be used simultaneously to achieve any desired geometries on the positioning surface. In some embodiments, one or more spacers may be used to space one optical component while another optical component may be simultaneously positioned on the same positioning surface without making use of any spacers.

While the examples herein primarily contemplate pressing components for optical systems against one or more positioning surfaces and/or reference surfaces of a micro-optical bench, a person of skill in the art will appreciate, in light of the disclosure herein, that similar techniques may be applied by using positioning surfaces and/or reference surfaces that are provided as part of any one or more other devices, components, or structures other than a micro-optical bench.

The examples herein primarily contemplate a die for a photonic system being aligned with one or more other dies and/or with one or more fibers; however, in some embodiments, the techniques disclosed herein may be used to align any precisely-sized component in an optical system into which it is integrated.

While examples (and certain claims) herein contemplate forming a first surface of an optical component by separating the optical component from a substrate and then pressing the first surface of the component against a reference surface, the techniques disclosed herein include pressing a first surface of an optical component (or other component) against a reference surface without first forming the first surface by separating the optical component from a substrate. That is, a surface (e.g., a precisely shaped and sized and flat surface) of a component may be formed and provided in any suitable manner, and a method for aligning one or more components of a photonic system may nonetheless include positioning the surface of the component at a predetermined position on a positioning surface by pressing the surface of the component against a reference surface, wherein positioning the component in the predetermined position causes one or more optical features of the component to optically align with one or more other optical features of a photonic system into which the component is integrated.

It should be noted, and will be appreciated by a person of ordinary skill in the art in light of the disclosures herein, that, while the examples discussed herein are set forth with respect to alignment and coupling of optical components, similar techniques for precise alignment and/or coupling of non-optical components may be used with a same or similar micro-optical bench.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of any and all patents and publications referred to in this application are hereby incorporated herein by reference.

The invention claimed is:

1. A method for aligning components of a photonic system, the method comprising:
    separating a first component from a substrate such that the first component comprises a first surface that is a predetermined distance from a first optical feature of the first component; and
    positioning the first component at a predetermined position on a positioning surface by pressing the first surface of the first component against a first reference surface, wherein positioning the first component in the predetermined position causes the first optical feature of the first component to optically align with a second optical feature of a photonic system into which the first component is integrated;
    wherein:
        the positioning surface and the first reference surface are part of a micro-optical bench;
        wherein the micro-optical bench comprises a secondary component surface parallel to the positioning surface;
        the second optical feature is provided by an optical fiber;
        the secondary component surface comprises a groove configured to accept the optical fiber;
        an end of the optical fiber that optically aligns with the first component extends beyond an edge of the secondary component surface and overlaps with the positioning surface; and
        positioning the first component in the predetermined position comprises pressing a second surface of the first component against the end of the optical fiber.

2. The method of claim 1, wherein separating the first component from the substrate comprises:
    creating a dicing layer in the substrate; and
    applying force to the substrate to separate the first component from a remainder of the substrate along the dicing layer, wherein separating the first component along the dicing layer creates the first surface of the first component formed along the dicing layer.

3. The method of claim 2, wherein creating a dicing layer in the substrate comprises focusing a laser on a plurality of internal locations of the substrate.

4. The method of claim 1, wherein the first surface of the first component satisfies an envelope requirement of less than or equal to +100 µm and less than or equal to −100 µm.

5. The method of claim 4, wherein separating the first component from the substrate causes the first surface to satisfy the envelope requirement of the first surface.

6. The method of claim 1, wherein the positioning surface is transverse to and adjacent to the first reference surface.

7. The method of claim 1, wherein:
    the micro-optical bench comprises a second reference surface, wherein the second reference surface is transverse to and adjacent to both the first reference surface and the positioning surface, and positioning the first component in the predetermined position comprises pressing a second surface of the first component against the second reference surface.

8. The method of claim 1, wherein the end of the optical fiber extends beyond the edge of the secondary component surface by a distance of less than or equal to 5 mm.

9. The method of claim 1, wherein the optical fiber has a diameter of less than or equal to 5 mm.

10. The method of claim 1, wherein an end of the optical fiber that optically aligns with the first component is flush with an edge of the secondary component surface.

11. The method of claim 1, wherein the micro-optical bench comprises a third reference surface, wherein the third reference surface is parallel to the first reference surface and is adjacent to the positioning surface.

12. The method of claim 1, wherein the micro-optical bench comprises one or more indentations formed in the first reference surface.

13. The method of claim 1, wherein the positioning surface and the first reference surface are formed by etching into a body of the micro-optical bench.

14. The method of claim 13, wherein:
etching into the body of the micro-optical bench comprises removing a first layer comprising a first material and not removing a second layer comprising a second material.

15. The method of claim 13, wherein:
etching into the body of the micro-optical bench comprises chemically removing material from the body at a predefined rate.

16. The method of claim 1, wherein the micro-optical bench is formed by a precision replication technique.

17. The method of claim 1, wherein:
the micro-optical bench comprises a plurality of reconfigurable pieces,
a first piece of the plurality of reconfigurable pieces comprises the positioning surface,
a second piece of the plurality of reconfigurable pieces comprises the first reference surface; and
the micro-optical bench is formed by placing the first piece in contact with the second piece.

18. The method of claim 1, wherein the second optical feature is provided by a second component.

19. The method of claim 18, wherein the second component is positioned on the positioning surface.

20. The method of claim 18, wherein the second component is positioned on a side of the first component opposite the positioning surface.

21. The method of claim 1, wherein the micro-optical bench comprises an optical element.

22. The method of claim 1, wherein the positioning surface of the micro-optical bench is formed of a transparent material.

23. The method of claim 1, wherein positioning the first component in the predetermined position causes a first alignment structure of the first component to align with a corresponding second alignment structure of a second component.

24. The method of claim 1, wherein positioning the first component in the predetermined position causes a first alignment structure of the first component to align with a corresponding third alignment structure integrated into a surface selected from the positioning surface and the first reference surface.

25. The method of claim 1, wherein positioning the first component in the predetermined position causes a first electrical connector structure of the first component to align with a second electrical connector structure of a second component.

26. The method of claim 1, wherein positioning the first component in the predetermined position causes a first electrical connector structure of the first component to align with a third electrical connector structure integrated into a surface selected from the positioning surface and the first reference surface.

27. The method of claim 1, wherein separating the first component from the substrate comprises creating an optical facet in the first component.

28. The method of claim 1, wherein the positioning surface satisfies an envelope requirement of less than or equal to +100 μm and −100 μm.

29. The method of claim 1, wherein the first reference surface satisfies an envelope requirement of less than or equal to +100 μm and −100 μm.

30. The method of claim 1, wherein the first component comprises one or more of silicon, sapphire, gallium arsenide, glass, lithium tantalite, silicon carbide, lithium niobate, quartz glass, borosilicate glass, gallium nitride, and indium phosphide.

31. The method of claim 1, wherein the first component is a die and wherein the substrate is a wafer.

32. The method of claim 1, wherein the micro-optical bench comprises one or more of silicon, glass, fused silica, quartz, lithium niobate, ceramic, polymer, thermoplastic, and photoresist.

33. The method of claim 1, wherein:
the first component comprises a first set of microadjustment pads having a first spacing,
positioning the first component in the predetermined position on the positioning surface comprises positioning the first set of microadjustment pads to face a second set of microadjustment pads disposed on an adjacent component, the second set of microadjustment pads having a second spacing different from the first spacing, and
the method further comprises heating a pair of microadjustment pads comprising a first pad in the first set and a second pad in the second set, wherein the heating causes a relative positioning of the first component and the adjacent component to change so as to align the pair of microadjustment pads.

34. The method of claim 33, wherein the adjacent component is positioned on the positioning surface.

35. The method of claim 33, wherein the adjacent component is a micro-optical bench of which the positioning surface is a part.

36. The method of claim 1, further comprising bonding the first component to an adjacent component by:
focusing a laser on an interface between the first component and the adjacent component such that part of at least one of the first component and the adjacent component heats and becomes molten material; and
ceasing laser excitation to allow the molten material to cool and solidify to bond the first component to the adjacent component.

37. The method of claim 36, wherein the adjacent component is positioned on the positioning surface.

38. The method of claim 36, wherein the adjacent component is a micro-optical bench of which the positioning surface is a part.

39. A fabrication system for aligning photonic systems, the fabrication system comprising:

a positioning surface adjacent to and transverse to a first reference surface, wherein the positioning surface and first reference surface are configured such that pressing a first surface of a first component against the first reference surface causes the first component to be positioned in a predetermined position such that an optical feature of the first component is aligned with a second optical feature of a photonic system into which the first component is integrated;

wherein:
the positioning surface and the first reference surface are part of a micro-optical bench;
wherein the micro-optical bench comprises a secondary component surface parallel to the positioning surface;
the second optical feature is provided by an optical fiber;
the secondary component surface comprises a groove configured to accept the optical fiber;
an end of the optical fiber that optically aligns with the first component extends beyond an edge of the secondary component surface and overlaps with the positioning surface; and
positioning the first component in the predetermined position comprises pressing a second surface of the first component against the end of the optical fiber.

40. The fabrication system of claim 39, wherein the positioning surface satisfies an envelope requirement of less than or equal to +100 μm and less than or equal to −100 μm.

41. The fabrication system of claim 39, wherein the first reference surface satisfies an envelope requirement of less than or equal to +100 μm and less than or equal to −100 μm.

42. The fabrication system of claim 39, further comprising a second reference surface, wherein the second reference surface is transverse to and adjacent to both the first reference surface and the positioning surface, and
wherein the positioning surface, first reference surface, and second reference surface are configured such that pressing a second surface of the first component against the second reference surface causes the first component to be positioned in the predetermined position.

43. A method for aligning components of a photonic system, the method comprising:
separating a first component from a substrate such that the first component comprises a first surface that is a predetermined distance from a first optical feature of the first component; and
positioning the first component at a predetermined position on a positioning surface by pressing the first surface of the first component against a first reference surface, wherein positioning the first component in the predetermined position causes the first optical feature of the first component to optically align with a second optical feature of a photonic system into which the first component is integrated;
wherein:
the first component comprises a first set of microadjustment pads having a first spacing,
positioning the first component in the predetermined position on the positioning surface comprises positioning the first set of microadjustment pads to face a second set of microadjustment pads disposed on an adjacent component, the second set of microadjustment pads having a second spacing different from the first spacing, and
the method further comprises heating a pair of microadjustment pads comprising a first pad in the first set and a second pad in the second set, wherein the heating causes a relative positioning of the first component and the adjacent component to change so as to align the pair of microadjustment pads.

44. The method of claim 43, wherein the positioning surface and the first reference surface are part of a micro-optical bench.

45. The method of claim 44, wherein the micro-optical bench comprises one or more indentations formed in the first reference surface.

46. The method of claim 44, wherein the positioning surface and the first reference surface are formed by etching into a body of the micro-optical bench.

47. The method of claim 44, wherein:
the micro-optical bench comprises a plurality of reconfigurable pieces,
a first piece of the plurality of reconfigurable pieces comprises the positioning surface,
a second piece of the plurality of reconfigurable pieces comprises the first reference surface; and
the micro-optical bench is formed by placing the first piece in contact with the second piece.

48. The method of claim 43, wherein the second optical feature is provided by a second component.

49. The method of claim 48, wherein the second component is positioned on the positioning surface.

50. The method of claim 44, wherein the micro-optical bench comprises an optical element.

51. The method of claim 44, wherein the positioning surface of the micro-optical bench is formed of a transparent material.

52. The method of claim 43, wherein positioning the first component in the predetermined position causes a first alignment structure of the first component to align with a corresponding second alignment structure of a second component.

53. The method of claim 43, wherein positioning the first component in the predetermined position causes a first alignment structure of the first component to align with a corresponding third alignment structure integrated into a surface selected from the positioning surface and the first reference surface.

54. The method of claim 43, wherein positioning the first component in the predetermined position causes a first electrical connector structure of the first component to align with a second electrical connector structure of a second component.

55. The method of claim 43, wherein positioning the first component in the predetermined position causes a first electrical connector structure of the first component to align with a third electrical connector structure integrated into a surface selected from the positioning surface and the first reference surface.

56. The method of claim 43, wherein separating the first component from the substrate comprises creating an optical facet in the first component.

57. The method of claim 43, further comprising bonding the first component to an adjacent component by:
focusing a laser on an interface between the first component and the adjacent component such that part of at least one of the first component and the adjacent component heats and becomes molten material; and
ceasing laser excitation to allow the molten material to cool and solidify to bond the first component to the adjacent component.

58. A fabrication system for aligning photonic systems, the fabrication system comprising:

a positioning surface adjacent to and transverse to a first reference surface, wherein the positioning surface and first reference surface are configured such that pressing a first surface of a first component against the first reference surface causes the first component to be positioned in a predetermined position such that an optical feature of the first component is aligned with a second optical feature of a photonic system into which the first component is integrated; and a set of microadjustment pads having a spacing from one another;

wherein heating a pair of microadjustment pads comprising a first pad in the set and a corresponding pad in a second set of microadjustment pads disposed on the first component causes a relative positioning of the first component and the positioning surface to change so as to align the pair of microadjustment pads.

59. The fabrication system of claim 58, further comprising a second reference surface, wherein the second reference surface is transverse to and adjacent to both the first reference surface and the positioning surface, and wherein the positioning surface, first reference surface, and second reference surface are configured such that pressing a second surface of the first component against the second reference surface causes the first component to be positioned in the predetermined position.

60. The fabrication system of claim 58, further comprising a secondary component surface parallel to the positioning surface.

61. The fabrication system of claim 58, wherein the positioning surface and the first reference surface are part of a micro-optical bench.

* * * * *